United States Patent
Zhamu et al.

(10) Patent No.: US 9,166,252 B2
(45) Date of Patent: *Oct. 20, 2015

(54) SURFACE-CONTROLLED LITHIUM ION-EXCHANGING ENERGY STORAGE DEVICE

(75) Inventors: Aruna Zhamu, Centerville, OH (US); ChenGuang Liu, Fairbone, OH (US); David Neff, Fairbone, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 284 days.

This patent is subject to a terminal disclaimer.

(21) Appl. No.: 12/928,927
(22) Filed: Dec. 23, 2010

(65) Prior Publication Data
US 2012/0164539 A1    Jun. 28, 2012

(51) Int. Cl.
*H01M 4/131*    (2010.01)
*H01M 4/133*    (2010.01)
(Continued)

(52) U.S. Cl.
CPC ........... *H01M 10/0525* (2013.01); *H01G 11/36* (2013.01); *H01G 11/50* (2013.01); *H01G 11/56* (2013.01); *H01M 4/0445* (2013.01); *H01M 4/13* (2013.01); *H01M 4/133* (2013.01); *H01M 4/134* (2013.01); *H01M 4/137* (2013.01); *H01M 4/1399* (2013.01); *H01M 4/382* (2013.01);
(Continued)

(58) Field of Classification Search
CPC ... H01M 4/0445; H01M 4/133; H01M 4/134; H01M 4/137; H01M 4/1399; H01M 4/382; H01M 4/405; H01M 4/587; H01M 4/60; H01M 4/602; H01M 4/604; H01M 4/13; H01M 10/0525; H01G 11/50; H01G 11/56; H01G 11/36

USPC ............... 429/300, 218.1, 231.8, 231.95
See application file for complete search history.

(56) References Cited

U.S. PATENT DOCUMENTS

| 7,071,258 B1 | 7/2006 | Jang et al. |
| 7,623,340 B1 | 11/2009 | Song et al. |

(Continued)

FOREIGN PATENT DOCUMENTS

| CN | 101420021 A | * | 4/2009 |
| JP | 2009245903 A | * | 10/2009 |
| WO | WO 2005022666 A2 | * | 3/2005 |

OTHER PUBLICATIONS

Machida et al., Machine translation of JP 2009-245903 A, Oct. 2009.*

(Continued)

*Primary Examiner* — Sean P Cullen

(57) ABSTRACT

A surface-controlled, lithium ion-exchanging battery device comprising: (a) A positive electrode (cathode) comprising a first functional material having a first lithium-capturing or lithium-storing surface; (b) A negative electrode (anode) comprising a second functional material having a second lithium-capturing or lithium-storing surface; (c) A porous separator disposed between the two electrodes, and (d) A lithium-containing electrolyte (preferably liquid or gel electrolyte) in physical contact with the two electrodes; wherein at least one of the two electrodes contains therein a lithium source (e.g., lithium foil, lithium powder, stabilized lithium particles, etc) prior to the first charge or the first discharge cycle of the battery device. This new generation of energy storage device exhibits the best properties of both the lithium ion battery and the supercapacitor.

29 Claims, 9 Drawing Sheets

(51) Int. Cl.
| | |
|---|---|
| H01M 4/134 | (2010.01) |
| H01M 4/137 | (2010.01) |
| H01M 4/485 | (2010.01) |
| H01M 4/505 | (2010.01) |
| H01M 4/525 | (2010.01) |
| H01M 4/583 | (2010.01) |
| H01M 4/60 | (2006.01) |
| H01M 10/0525 | (2010.01) |
| H01M 4/04 | (2006.01) |
| H01M 4/13 | (2010.01) |
| H01M 4/1399 | (2010.01) |
| H01M 4/38 | (2006.01) |
| H01M 4/40 | (2006.01) |
| H01M 4/587 | (2010.01) |
| H01G 11/50 | (2013.01) |
| H01G 11/56 | (2013.01) |
| H01G 11/36 | (2013.01) |
| H01M 10/0565 | (2010.01) |
| H01M 10/0566 | (2010.01) |
| H01M 4/02 | (2006.01) |

(52) U.S. Cl.
CPC ............ *H01M 4/405* (2013.01); *H01M 4/587* (2013.01); *H01M 4/60* (2013.01); *H01M 4/602* (2013.01); *H01M 4/604* (2013.01); *H01M 4/131* (2013.01); *H01M 4/485* (2013.01); *H01M 10/0565* (2013.01); *H01M 10/0566* (2013.01); *H01M 2004/021* (2013.01); *Y02E 60/122* (2013.01); *Y02E 60/13* (2013.01)

(56) References Cited

U.S. PATENT DOCUMENTS

| | | | |
|---|---|---|---|
| 7,745,047 B2 | 6/2010 | Zhamu et al. | |
| 8,252,069 B2* | 8/2012 | Feng et al. | ................... 29/623.5 |
| 8,889,298 B2* | 11/2014 | Zhamu et al. | ............. 429/231.8 |
| 8,895,189 B2* | 11/2014 | Zhamu et al. | ............. 429/231.8 |
| 2007/0190422 A1* | 8/2007 | Morris | ....... 429/231.4 |
| 2009/0117467 A1* | 5/2009 | Zhamu et al. | ............. 429/231.8 |
| 2011/0275005 A1* | 11/2011 | Zhu et al. | ..................... 429/482 |

OTHER PUBLICATIONS

T. Le Gall, et al. J. Power Sources, 119 (2003) 316-320.
H. Chen, et al. "From biomass to a renewable LixC6O6 organic electrode for sustainable Li-ion batteries," ChemSusChem, 1 (2008) 348-355.
S. W. Lee, et al, "High Power Lithium Batteries from Functionalized Carbon Nanotubes," Nature Nanotechnology, 5 (2010) 531-537.
X. Y. Han, et al. "Aromatic carbonyl derivative polymers as high-performance Li-ion storage materials," Adv. Material, 19, 1616-1621 (2007).
J. F. Xiang, et al. "A novel coordination polymer as positive electrode material for lithium ion battery," Crystal Growth & Design, 8, 280-282 (2008).

* cited by examiner

Soft carbon

Hard carbon

Carbon Black macro- or
meso-pores

FIG. 8(A) X. Han, et al (prior art)

SURFACE-CONTROLLED LITHIUM ION-EXCHANGING ENERGY STORAGE DEVICE

This invention is based on the research results of a project sponsored by the US National Science Foundation SBIR-STTR Program.

FIELD OF THE INVENTION

The present invention relates generally to the field of electrochemical energy storage devices and, more particularly, to a totally new lithium-exchanging battery device wherein both the anode and the cathode do not involve lithium diffusion in and out of the bulk of a solid electrode-active material. The lithium storage mechanism in both the anode and the cathode is surface-controlled, obviating the need for solid-state diffusion of lithium, which otherwise is very slow. This device has the high energy density of a lithium-ion battery and the high power density of a supercapacitor. This device is herein referred to as a surface-controlled, lithium ion-exchanging battery device.

BACKGROUND OF THE INVENTION

Supercapacitors (Ultra-capacitors or Electro-chemical Capacitors):

Supercapacitors are being considered for electric vehicle (EV), renewable energy storage, and modern grid applications. The high volumetric capacitance density of a supercapacitor (10 to 100 times greater than those of electrolytic capacitors) derives from using porous electrodes to create a large surface area conducive to the formation of diffuse double layer charges. This electric double layer (EDL) is created naturally at the solid-electrolyte interface when voltage is imposed. This implies that the specific capacitance of a supercapacitor is directly proportional to the specific surface area of the electrode material, e.g. activated carbon. This surface area must be accessible by electrolyte and the resulting interfacial zones must be sufficiently large to accommodate the EDL charges.

This EDL mechanism is based on surface ion adsorption. The required ions are pre-existing in a liquid electrolyte and do not come from the opposite electrode. In other words, the required ions to be deposited on the surface of a negative electrode (anode) active material (e.g., activated carbon particle) do not come from the positive electrode (cathode) side, and the required ions to be deposited on the surface of a cathode active material do not come from the anode side. When the supercapacitor is re-charged, local ions are deposited onto their respective local electrodes (typically via local molecular or ionic polarization of charges). There is no exchange of ions between an anode active material and a cathode active material.

In some supercapacitors, the stored energy is further augmented by pseudo-capacitance effects due to some electrochemical reactions (e.g., redox). In such a pseudo-capacitor, the ions involved in a redox pair also pre-exist in the same electrode. Again, there is no exchange of ions between an anode active material and a cathode active material.

Since the formation of EDLs does not involve a chemical reaction or an exchange of ions between the two opposite electrodes, the charge or discharge process of an EDL supercapacitor can be very fast, typically in seconds, resulting in a very high power density (typically 5,000-10,000 W/Kg). Compared with batteries, supercapacitors offer a higher power density, require no maintenance, offer a much higher cycle-life, require a very simple charging circuit, experience no "memory effect," and are generally much safer. Physical, rather than chemical, energy storage is the key reason for their safe operation and extraordinarily high cycle-life.

Despite the positive attributes of supercapacitors, there are several technological barriers to widespread implementation of supercapacitors for various industrial applications. For instance, supercapacitors possess very low energy densities when compared to batteries (e.g., 5-8 Wh/kg for commercial supercapacitors vs. 10-30 Wh/Kg for the lead acid battery and 50-100 Wh/kg for the NiMH battery). Lithium-ion batteries possess a much higher energy density, typically in the range of 100-180 Wh/kg, based on the cell weight.

Lithium-Ion Batteries:

Although possessing a much higher energy density, lithium-ion batteries deliver a very low power density (typically 100-500 W/Kg), requiring typically hours for re-charge. Conventional lithium-ion batteries also pose some safety concern.

The low power density or long re-charge time of a lithium ion battery is due to the mechanism of shuttling lithium ions between an anode and a cathode, which requires lithium ions to enter or intercalate into the bulk of anode active material particles during re-charge, and into the bulk of cathode active material particles during discharge. For instance, as illustrated in FIG. 1(A), in a most commonly used lithium-ion battery featuring graphite particles as an anode active material, lithium ions are required to diffuse into the inter-planar spaces of a graphite crystal at the anode during re-charge. Most of these lithium ions have to come all the way from the cathode side by diffusing out of the bulk of a cathode active particle, through the pores of a solid separator (pores being filled with a liquid electrolyte), and into the bulk of a graphite particle at the anode.

During discharge, lithium ions diffuse out of the anode active material (graphite particles), migrate through the liquid electrolyte phase, and then diffuse into the bulk of complex cathode crystals (e.g. lithium cobalt oxide, lithium iron phosphate, or other lithium insertion compound).

These intercalation or diffusion processes require a long time to accomplish because solid-state diffusion (or diffusion inside a solid) is difficult and slow. This is why, for instance, the current lithium-ion battery for plug-in hybrid vehicles requires 2-7 hours of recharge time, as opposed to just seconds for supercapacitors. The above discussion suggests that an energy storage device that is capable of storing as much energy as in a battery and yet can be fully recharged in one or two minutes like a supercapacitor would be considered a revolutionary advancement in energy storage technology.

More Recent Developments:

Instead of using an inorganic lithium insertion compound, such as $LiCoO_2$ and $LiFePO_4$, that requires lithium insertion into and extraction from the bulk of an inorganic particle (typically 100 nm-20 μm, but more typically 1-10 μm in diameter), several attempts have been made to use organic molecules or polymers as an electrode active material for the cathode (lithium metal alone as the anode). For instance, Le Gall, et al investigated Poly(2,5-dihydroxy-1,4-benzoquinone-3,6-methylene) as an organic polymer cathode [T. Le Gall, et al. J. Power Sources, 119 (2003) 316-320] and Chen, et al used $Li_xC_6O_6$ organic cathode, obtained from a renewable source, in a lithium ion battery [H. Chen, et al. "From biomass to a renewable $Li_xC_6O_6$ organic electrode for sustainable Li-ion batteries," ChemSusChem, 1(2008) 348-355]. In addition, X. Y. Han, et al. studied carbonyl derivative polymers ["Aromatic carbonyl derivative polymers as high-performance Li-ion storage materials," Adv. Material, 19, 1616-1621(2007)] and J. F. Xiang, et al. studied a coordination polymer as a cathode ["A novel coordination polymer as positive electrode material for lithium ion battery," Crystal Growth & Design, 8, 280-282 (2008)].

Unfortunately, these organic materials exhibit very poor electronic conductivity and, hence, electrons could not be quickly collected or could not be collected at all. Although these organic molecules contain carbonyl groups ($>C=O$) that could readily react with lithium ions (forming a redox pair), this redox mechanism was overwhelmed by the poor electronic conductivity. As a result, the battery cells featuring these organic molecules exhibit poor power densities. Le Gall et al added a large proportion of conductive acetylene black (typically 40-60% by weight) to partially overcome the conductivity issue; but, acetylene black significantly dilutes the amount of the active material. Further, the best achievable specific capacity of 150 mAhlg is far less than the theoretical specific capacity of 705 mAh/g of Poly(2,5-dihydroxy-1,4-benzoquinone-3,6-methylene).

Recently, more electrically conducting carbon nano-tubes (CNTs) containing carbonyl groups were used by Lee, et al to replace the organic molecules for use as a cathode material [S. W. Lee, et al, "High Power Lithium Batteries from Functionalized Carbon Nanotubes," Nature Nanotechnology, 5 (2010) 531-537]. The significantly higher electronic conductivity of CNTs does serve to overcome the poor conductivity problem of organic molecules. However, the CNT-based electrodes prepared by the layer-by-layer (LBL) approach still suffer from several technical and economical issues. Some of these issues are:

(1) CNTs are known to be extremely expensive due to the low yield, low production rate, and low purification rate commonly associated with the current CNT preparation processes. The high material costs have significantly hindered the widespread application of CNTs.

(2) CNTs tend to form a tangled mass resembling a hairball, which is difficult to work with (e.g., difficult to disperse in a liquid solvent or resin matrix).

(3) The so-called "layer-by-layer" approach (LBL) used by Lee, et al is a slow and expensive process that is not amenable to large-scale fabrication of battery electrodes, or mass production of electrodes with an adequate thickness (most of the batteries have an electrode thickness of 100-300 μm). The thickness of the LBL electrodes produced by Lee, et al (a noted MIT research group) was limited to 3 μm or less.

(4) One might wonder how the thickness of the LBL CNT electrodes would impact their performance. The data provided by Lee, et al (e.g. Fig. S-7 of the Supporting Material of Lee, et al) show that the power density dropped by one order of magnitude when the LBL CNT electrode thickness was increased from 0.3 μm to 3.0 μm. The performance is likely to drop even further if the electrode thickness is increased to that of a useful battery or supercapacitor electrode (e.g., 100-300 μm).

(5) Although the ultra-thin LBL CNT electrodes provide a high power density (since Li ions only have to travel an extremely short distance), there was no data to prove that CNT-based electrodes of practical thickness could even work due to the poor CNT dispersion and electrolyte inaccesability issues. Lee, et al showed that the CNT-based composite electrodes prepared without using the LBL approach did not exhibit particularly good performance.

(6) CNTs have very limited amount of suitable sites to accept a functional group without damaging the basal plane or graphene plane structure. A CNT has only one end that is readily functionalizable and this end is an extremely small proportion of the total CNT surface. By chemically functionalizing the exterior basal plane, one could dramatically compromise the electronic conductivity of a CNT.

Most recently, our research groups have reported, in two patent applications, the development of two new classes of highly conducting cathode active materials having a functional group that is capable of rapidly and reversibly forming a redox reaction with lithium ions. These materials are nano graphene (both single-layer graphene and multi-layer graphene sheets, collectively referred to as nano graphene platelets, NGPs) and disordered carbon (including soft carbon and hard carbon). These two patent applications are: C. G. Liu, et al., "Lithium Super-battery with a Functionalized Nano Graphene Cathode," U.S. patent application Ser. No. 12/806,679 (Aug. 19, 2010) and C. G. Liu, et al, "Lithium Super-battery with a Functionalized Disordered Carbon Cathode," U.S. patent application Ser. No. 12/924,211 (Sep. 23, 2010).

These new types of cathode active materials (used in the so-called lithium super-battery) include a chemically functionalized nano graphene platelet (NGP) or a functionalized disordered carbon material (such as soft carbon and hard carbon) having certain specific functional groups capable of reversibly and rapidly forming a redox pair with a lithium ion during the charge and discharge cycles of a battery cell. In these two patent applications, the functionalized disordered carbon or NGP is used in the cathode (not the anode) of the lithium super-battery. In this cathode, lithium ions in the liquid electrolyte only have to migrate to the edges or surfaces of graphene sheets (in the case of functionalized NGP cathode), or the edges/surfaces of the aromatic ring structures (small graphene sheets) in a disordered carbon matrix. No solid-state diffusion is required at the cathode. The presence of a functionalized graphene or carbon enables reversible storage of lithium on the surfaces (including edges), not the bulk, of the cathode material. Such a cathode material provides one type of lithium-storing or lithium-capturing surface. (There will be another type of lithium-storing surface, based on simple lithium deposition, to be discussed at a later section).

In conventional lithium-ion batteries, lithium ions must diffuse into and out of the bulk of a cathode active material, such as lithium cobalt oxide ($LiCoO_2$) and lithium iron phosphate ($LiFePO_4$). In these conventional lithium-ion batteries, lithium ions must also diffuse in and out of the inter-planar spaces in a graphite crystal serving as an anode active material. The lithium insertion or extraction procedures at both the cathode and the anode are very slow. Due to these slow processes of lithium diffusion in and out of these intercalation compounds (commonly referred to as solid-state diffusion processes), the conventional lithium ion batteries do not exhibit a high power density and the batteries require a long re-charge time. None of these conventional devices rely on select functional groups (e.g. attached at the edge or basal plane surfaces of a graphene sheet) that readily and reversibly form a redox reaction with a lithium ion from a lithium-containing electrolyte.

In contrast, the super-battery as reported in our two earlier patent applications (U.S. application Ser. No. 12/806,679 and Ser. No. 12/924,211), relies on the operation of a fast and reversible reaction between a functional group (attached or bonded to a graphene structure at the cathode) and a lithium ion in the electrolyte. Lithium ions coming from the anode side through a separator only have to diffuse in the liquid electrolyte residing in the cathode to reach a surface/edge of a graphene plane. These lithium ions do not need to diffuse into or out of the volume of a solid particle. Since no diffusion-limited intercalation is involved at the cathode, this process is fast and can occur in seconds. Hence, this is a totally new class of hybrid supercapacitor-battery that exhibits unparalleled and unprecedented combined performance of an exceptional power density, high energy density, long and stable cycle life, and wide operating temperature range. This device has the best of both battery and supercapacitor worlds.

In the lithium super-batteries described in these two patent applications, the anode comprises either particles of a lithium titanate-type anode active material (still requiring solid state diffusion), schematically illustrated in FIG. 1(B), or a lithium foil alone (without a nano-structured material to support or capture lithium ions/atoms), illustrated in FIG. 1(C). In the latter case, lithium has to deposit onto the front surface of an anode current collector alone (e.g. copper foil) when the battery is re-charged. Since the specific surface area of a current collector is very low (typically <<1 m$^2$/gram), the over-all lithium re-deposition rate is relatively low (this issue is being overcome in the instant invention).

Herein reported is another superior energy storage device that also operates on lithium ion exchange between the cathode and the anode. However, in this new device, both the cathode and the anode (not just the cathode) have a lithium-capturing or lithium-storing surface (typically both being nano-structured with many lithium-storing surfaces) and both electrodes (not just the cathode) obviate the need to engage in solid-state diffusion. This is illustrated in FIG. 1(D) and FIG. 2. Both the anode and the cathode have large amounts of surface areas to allow lithium ions to deposit thereon simultaneously, enabling dramatically higher charge and discharge rates and higher power densities. The uniform dispersion of these surfaces of a nano-structured material (e.g. graphene, CNT, disordered carbon, nano-wire, and nano-fiber) in an electrode also provides a more uniform electric field in the electrode in which lithium can more uniformly deposit without forming a dendrite. Such a nano-structure eliminates the potential formation of dendrites, which was the most serious problem in conventional lithium metal batteries (commonly used in 1980s and early 1990s before being replaced by lithium-ion batteries). Such a device is herein referred to as a surface-controlled, lithium ion-exchanging battery.

SUMMARY OF THE INVENTION

The present invention provides a surface-controlled, lithium ion-exchanging battery device comprising: (a) a positive electrode (cathode) comprising a first functional material having a first lithium-capturing or lithium-storing surface; (b) a negative electrode (anode) comprising a second functional material having a second lithium-capturing or lithium-storing surface; (c) a porous separator disposed between the two electrodes; and (d) a lithium-containing electrolyte in physical contact with the two electrodes; wherein at least one of the two electrodes contains therein a lithium source (e.g. solid lithium foil, chip, powder, or surface-stabilized lithium particles) prior to the first charge or the first discharge cycle of the battery device. The electrolyte preferably comprises liquid electrolyte or gel electrolyte in which lithium ions have a high diffusion coefficient. Solid electrolyte is normally not desirable, but some thin layer of solid electrolyte may be used if it exhibits a relatively high diffusion coefficient.

To illustrate the operational principle of this new battery device (FIG. 2(A)), one may consider a case wherein a lithium source (e.g. small pieces of lithium foil) is implemented between a nano-structured anode (e.g. comprising functionalized graphene sheets) and a porous polymer separator when the battery device is made, and wherein a nano-structured cathode comprises functionalized graphene sheets surrounded by interconnected pores that are preferably meso-scaled (2 nm-50 nm), but can be smaller than 2 nm. Referring to FIG. 2(A)-(C), during the first discharge cycle, lithium foil is ionized to generate lithium ions in the liquid electrolyte. Lithium ions rapidly migrate through the pores of the polymer separator into the cathode side. Since the cathode is also meso-porous having interconnected pores to accommodate liquid electrolyte therein, lithium ions basically just have to sail through liquid to reach a functional group on a surface or edge of a graphene sheet at the cathode. The subsequent surface redox reaction between a lithium ion and a surface-borne functional group (e.g., carbonyl, $>\!\!=\!\!O$) is fast and reversible. Because all the steps (lithium ionization, liquid phase diffusion, and surface redox reaction) are fast and no solid-state diffusion is required, the whole process is very fast, enabling fast discharging and a high power density. This is in stark contrast to the conventional lithium-ion battery wherein lithium ions are required to diffuse into the bulk of a solid cathode particle (e.g., micron-sized lithium cobalt oxide), which is a very slow process.

In the above example, the discharge process continues until either the lithium foil is completely ionized or all the functional groups at the cathode side are exhausted (i.e. each and every group has captured a lithium ion). During re-charge, lithium ions are released from the surface groups at the cathode, diffuse through liquid electrolyte, and get captured by surface-borne functional groups at the anode side (or simply get deposited onto a surface of the nano-structured anode material). Again, no solid-state diffusion is required and, hence, the whole process is very fast, requiring a short re-charge time. This is as opposed to the required solid-state diffusion of lithium ions into the bulk of graphite particles at the anode of a conventional lithium-ion battery.

Clearly, the presently invented battery device provides a very unique platform of exchanging lithium ions between an anode and a cathode that requires no solid-state diffusion in both electrodes. The process is substantially dictated by the surface reactions (surface ionization, surface deposition, or surface redox reaction), plus the liquid-phase diffusion (all being very fast). Hence, the device is herein referred to as a surface-controlled, lithium ion-exchanging battery. This is a totally different and patently distinct class of energy storage device than the conventional lithium-ion battery, wherein solid-state diffusion is required at both the anode and the cathode during both the charge and discharge cycles.

This new surface-controlled, lithium ion-exchanging battery device is also patently distinct from the conventional supercapacitor based on the electric double layer (EDL) mechanism or pseudo-capacitance mechanism. In both mechanisms, no lithium ions are exchanged between the two electrodes. In particular, our new battery device is patently distinct from the LBL CNT-based symmetric supercapacitor of Lee, et al [*Nature Nanotechnology*, 5 (2010) 531-537], wherein both the anode and the cathode are ultra-thin CNT structures prepared by the layer-by-layer (LBL) process. This symmetric supercapacitor does not contain an extra lithium source and does not involve exchange of lithium ions between two electrodes. Furthermore, in the report of Lee, et al, the super-battery device containing a lithium foil as the anode does not contain a nano-structured functional material at the anode (as schematically illustrated in FIG. 1(C)). The anode only has a current collector on which the returning lithiums ions are deposited during re-charge. Lee, et al also discloses a super-battery consisting of a lithium titanate anode and a LBL CNT cathode.

The presently invented surface-controlled, lithium ion-exchanging battery device is also patently distinct from the super-battery as disclosed in two of our earlier applications (U.S. application Ser. No. 12/806,679 and Ser. No. 12/924, 211), which does not have a functional material at the anode (The anode side only contains an anode current collector). In the presently invented battery device, not only the cathode but also the anode has large amounts of surface areas to allow lithium ions to deposit thereon simultaneously, enabling dramatically higher charge and discharge rates and higher power densities. In other words, in a high current density situation (during fast re-charging), great amounts of lithium ions swarm into the anode side, each looking for a site to deposit or react onto. The anode current collector alone has only a small amount of surface area available at one time, incapable of accommodating such a high flux of lithium ions. By contrast, the huge specific surface area of a nano-structured functional material (e.g., graphene or CNT) is capable of accommodating a huge amount of lithium ions at the same time. In addition, the uniform dispersion of these surfaces of a nano material (e.g. graphene or CNT) in an electrode also provides a more uniform electric field in the electrode in which lithium can more uniformly deposit without forming a dendrite. More surface areas also mean more deposition spots and each spot only has a small quantity of lithium, insufficient to form a dangerous dendrite. Such a nano-structure eliminates the potential formation of dendrites, which was the most serious problem in conventional lithium metal batteries.

In this device, preferably at least one of the two electrodes has a functional material having a functional group (e.g., carbonyl) that is capable of reversibly reacting with a lithium atom or ion. Preferably, both of the two electrodes have a functional material having a functional group that reversibly reacts with a lithium atom or ion. Preferably, at least one of the two electrodes has a nano-structured functional material having a high specific surface area no less than 100 $m^2$/gram (preferably >500 $m^2$/gram, more preferably >1,000 $m^2$/gram, and most preferably >1,500 $m^2$/gram) to store or support lithium ions or atoms thereon. More preferably, both electrodes have a nano-structured functional material having a high specific surface area no less than 100 $m^2$/gram (preferably >500 $m^2$/gram, more preferably >1,000 $m^2$/gram, and most preferably >1,500 $m^2$/gram) to store or support lithium ions or atoms thereon.

Preferably, the lithium source comprises a lithium chip, lithium foil, lithium powder, surface-passivated or stabilized lithium particles, or a combination thereof. The lithium source may be implemented at the anode side before the first discharge procedure is carried out on this battery device. Alternatively, the lithium source may be implemented at the cathode side before the first charge procedure is carried out on this battery device. As another alternative, both the cathode and the anode may be fabricated to contain some lithium source during the battery manufacturing process. It is important to note that this solid lithium source provides the majority of the lithium ions that are to be exchanged between the anode and the cathode during the charge-discharge cycles. Although the lithium-containing electrolyte naturally provides some of the needed lithium ions, this amount is way too short to enable the battery device to deliver either a high energy density or a high power density. This is why the symmetric supercapacitor of Lee et al (with both the anode and the cathode containing only LBL CNTs, but no additional solid lithium source) performs so poorly in terms of both the energy density and power density [Lee, et al, *Nature Nanotechnology*, 5 (2010) 531-537]. These were simply no lithium ions being exchanged between the cathode side and the anode side.

In the presently invented battery device, at least a functional material (preferably both the first and second functional materials) is (are) selected from the group consisting of:
(a) A disordered carbon material selected from a soft carbon, hard carbon, polymeric carbon or carbonized resin, mesophase carbon, coke, carbonized pitch, carbon black, activated carbon, or partially graphitized carbon;
(b) A nano graphene platelet selected from a single-layer graphene sheet or multi-layer graphene platelet;
(c) A carbon nanotube selected from a single-walled carbon nanotube or multi-walled carbon nanotube;
(d) A carbon nano-fiber, nano-wire, metal oxide nano-wire or fiber, conductive polymer nano-fiber, or a combination thereof.
(e) A carbonyl-containing organic or polymeric molecule;
(f) A functional material containing a carbonyl, carboxylic, or amine group; and
(g) Combinations thereof.

Although CNTs are not particularly desired nano-structured materials due to the high costs and other technical issues, CNTs (alone or in combination with other functional or nano-structured material) can still be used in the presently invented surface-controlled lithium ion-exchanging battery.

The functional material in the anode and/or cathode may be selected from the group consisting of Poly(2,5-dihydroxy-1, 4-benzoquinone-3,6-methylene), $Li_xC_6O_6$ (x=1-3), $Li_2(C_6H_2O_4)$, $Li_2C_8H_4O_4$ (Li terephthalate), $Li_2C_6H_4O_4$(Li trans-trans-muconate), 3,4,9,10-perylenetetracarboxylicacid-dianhydride (PTCDA) sulfide polymer, PTCDA, 1,4,5, 8-naphthalene-tetracarboxylicacid-dianhydride (NTCDA), Benzene-1,2,4,5-tetracarboxylic dianhydride, 1,4,5,8-tetrahydroxy anthraquinon, Tetrahydroxy-p-benzoquinone, and combinations thereof. These organic or polymeric materials (molecules or salts) possess functional groups (e.g. carbonyl group) capable of undergoing a reversible and fast redox reaction with lithium. These functional materials tend to have a relatively low electronic conductivity and, hence, preferably the functional material selected from this group is combined with (e.g. chemically bonded or attached to a nano-structured material, such as nano graphene, carbon nanotube, disordered carbon, nano graphite, material selected from nano graphene, carbon nanotube, disordered carbon, nano graphite, metal nanowire, conductive nano-wire, carbon nano-fiber, and polymeric nano-fiber). For instance, both graphene and the constituent aromatic rings of a disordered carbon (soft carbon, hard carbon, activated carbon, carbon black, etc) can have, on their edges or surfaces, functional groups that can react with the matting functional groups on the aforementioned functional materials (e.g. the hydroxyl group on Tetrahydroxy-p-benzoquinone).

Alternatively, a nano-structured carbon material, such as non-functionalized nano graphene, carbon nanotube, disordered carbon, or nano graphite, may simply provide a surface upon which lithium atoms can be deposited, e.g. via electrochemical deposition. Non-functionalized surface can still serve as a physical support or substrate for lithium atoms. The mere existence of a nano-structured material, even without a reactive functional group, can still provide a huge amount of supporting surfaces. This non-functionalized surface is the second type of lithium-storing surface in the present context.

The disordered carbon material may be formed of two phases with a first phase being graphite crystals or stacks of graphene planes and a second phase being non-crystalline carbon and wherein the first phase is dispersed in the second phase or bonded by the second phase. The disordered carbon material may contain less than 90% by volume of graphite crystals and at least 10% by volume of non-crystalline carbon.

The functional materials may comprise nano graphene selected from a single-layer graphene sheet or a multi-layer graphene platelet. Alternatively, the functional materials may comprise single-walled or multi-walled carbon nanotube. In the battery device, at least one of the functional materials is a nano-structured material having a specific surface area of at least 100 m$^2$/g, preferably at least 500 m$^2$/g, and more preferably at least 1,000 m$^2$/g, and most preferably at least 1,500 m$^2$/g.

Preferably, at least one of the functional materials has a functional group selected from the group consisting of —COOH, =O, —NH$_2$, —OR, and —COOR, where R is a hydrocarbon radical.

The lithium source may be selected from lithium metal (e.g., in a thin foil or powder form, preferably stabilized or surface-passivated), a lithium metal alloy, a mixture of lithium metal or lithium alloy with a lithium intercalation compound, a lithiated compound, lithiated titanium dioxide, lithium titanate, lithium manganate, a lithium transition metal oxide, $Li_4Ti_5O_{12}$, or a combination thereof. Specifically, the lithium intercalation compound or lithiated compound may be selected from the following groups of materials:
(a) Lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
(b) Lithiated alloys or intermetallic compounds of Si, Ge, Sn, Pb, Sb, Bi, Zn, Al, Ti, Co, Ni, Mn, Cd, and their mixtures;
(c) Lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof, and
(d) Lithiated salts or hydroxides of Sn.

The electrolyte may be selected from any of the electrolytes used in conventional lithium ion batteries or lithium metal batteries. The electrolyte may comprise a lithium salt-doped ionic liquid. In the battery device, the positive electrode preferably has a thickness greater than 5 µm, preferably greater than 50 µm, and more preferably greater than 100 µm.

Quite surprisingly, the battery device provides an energy density typically of no less than 100 Wh/kg and power density no lower than 15 Kw/kg, all based on the total electrode weight. More typically, the battery device provides an energy density of greaters than 200 Wh/kg and power density greater than 10 Kw/kg. In many cases, the battery device provides an energy density greater than 300 Wh/kg and power density greater than 5 Kw/kg. Most typically, the battery device provides an energy density greater than 300 Wh/kg or a power density greater than 100 Kw/kg. In some cases, the power density is significantly higher than 200 Kw/kg, or even higher than 400 Kw/kg, which is orders of magnitude higher than the power densities (1-10 Kw/kg) of conventional supercapacitors.

DESCRIPTION OF THE PREFERRED EMBODIMENTS

Figure 1:
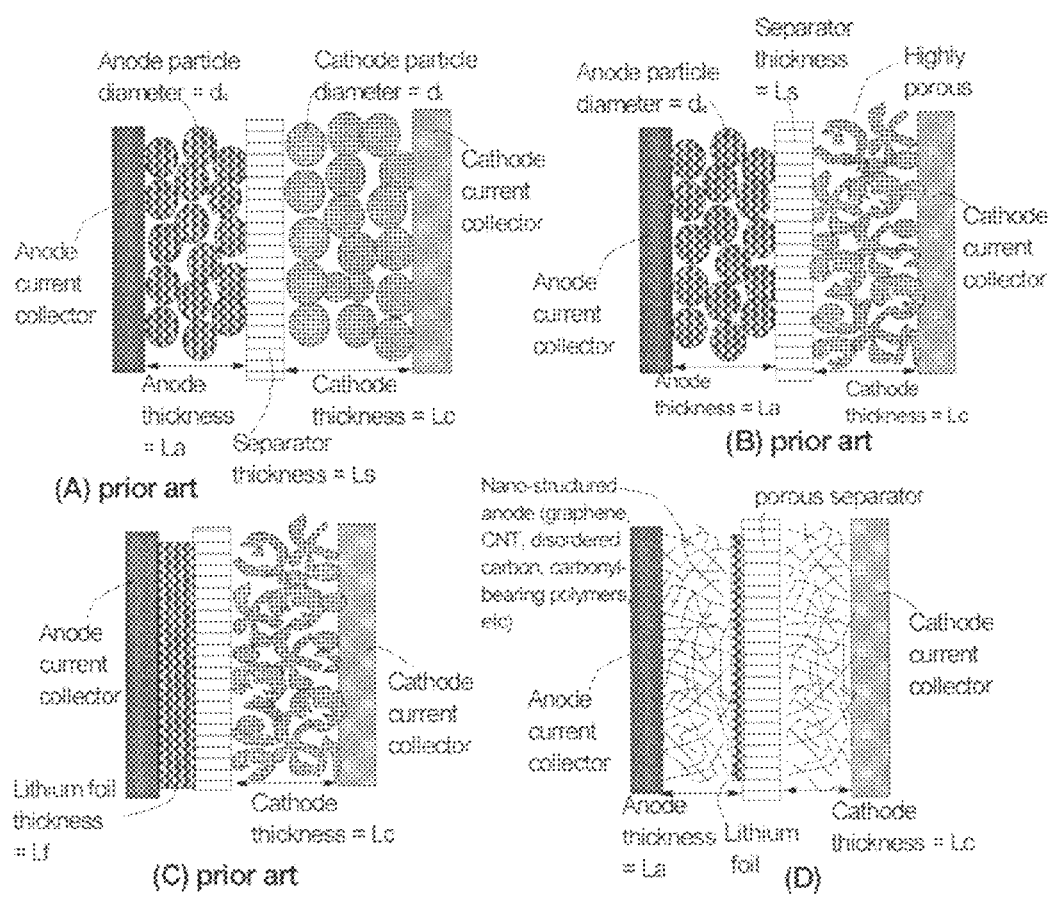
FIG. 1 (A) a prior art lithium-ion battery cell using graphite, Si, or lithium titanate as an anode active material and lithium iron phosphate (or lithium cobalt oxide, etc) as a cathode active material; (B) a prior art lithium super-battery cell with a lithium titanate as an anode active material and a cathode made of a functional material (e.g., functionalized nano graphene, CNT, or disordered carbon powder); (C) a prior art lithium super-battery cell with a lithium foil anode (but no nano-structured functional material) and a cathode made of functionalized graphene, CNT, or disordered carbon; (D) an example of the presently invented surface-controlled, lithium ion-exchanging battery device, which contains a nano-structured functional material (with or without a functional group capable of reacting with lithium ions or atoms) at the anode, a lithium source (e.g. lithium foil or surface-passivated lithium powder), a porous separator, liquid or gel electrolyte (liquid being preferred), a nano-structured functional material at the cathode.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting the claimed invention.

This invention provides an electrochemical energy storage device that is herein referred to as a surface-controlled, lithium ion-exchanging battery. This device exhibits a power density significantly higher than the power densities of conventional supercapacitors and dramatically higher than those of conventional lithium ion batteries. This device exhibits an energy density comparable to that of a battery, and significantly higher than those of conventional supercapacitors.

This surface-controlled, ion-exchanging battery is composed of a positive electrode containing a functional material having a lithium-storing or lithium-capturing surface (the functional material being preferably nano-structured with nano-scaled or meso-scaled pores), a negative electrode containing a functional material having a lithium-storing or lithium-capturing surface (preferably nano-structured with nano-scaled or meso-scaled pores), a porous separator disposed between the two electrodes, and a lithium-containing electrolyte in physical contact with the two electrodes. A particularly desirable feature of the negative electrode (anode) and/or the positive electrode (cathode) is that the electrode comprises a chemically functionalized material (e.g., nano graphene, carbon nanotube, disordered carbon particles, etc) having a functional group that is capable of rapidly and reversibly reacting with a lithium atom or ion during the charge and discharge cycles.

Although there is no limitation on the electrode thickness, the presently invented positive electrode preferably has a thickness greater than 5 μm, more preferably greater than 50 μm, and most preferably greater than 100 μm. An example of such a surface-controlled, ion-exchanging battery device is given in FIG. 1(D) and FIG. 2.

Theoretical Aspects (Lithium Ion Diffusion Kinetics of Conventional Lithium-Ion Batteries, Super-Batteries, and the New Surface-Controlled, Ion-Exchanging Battery Device)

Not wishing to be constrained by any theory, but we would like to offer the following theoretical considerations that perhaps are helpful to the readers. We will provide some insight as to how a surface-controlled battery device operates and why such a lithium battery exhibits exceptional power densities un-matched by conventional supercapacitors and the already impressive super-batteries disclosed earlier by us. We will also shed some light on why the electrode thickness of a lithium battery (including a surface-exchanging battery device, lithium super-battery, and conventional lithium-ion battery) plays such a critical role in dictating the power density in such a dramatic manner.

Figure 2:
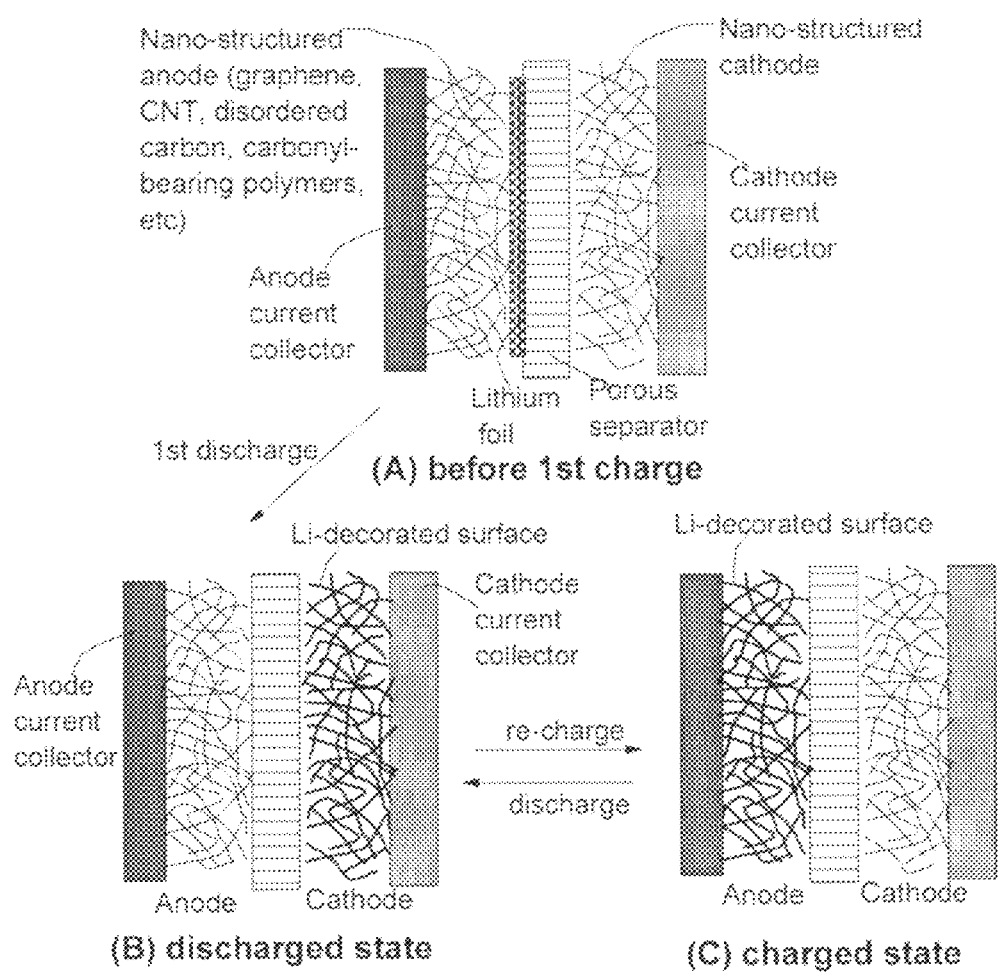
FIG. 2 (A) The structure of a surface-controlled, lithium ion-exchanging battery device when it is made (prior to the first discharge or charge cycle), containing a nano-structured functional material at the anode, a lithium source (e.g. lithium foil or surface-stabilized lithium powder), a porous separator, liquid electrolyte, a nano-structured functional material at the cathode; (B) The structure of this battery device after its first discharge operation (lithium is ionized with the lithium ions diffusing through liquid electrolyte to reach surface-borne functional groups in the nano-structured cathode and rapidly react with these groups); (C) The structure of this battery device after being re-charged (lithium ions are released from the cathode surface, diffusing through liquid electrolyte to reach surface-borne functional groups in the nano-structured anode and rapidly react with these groups). If the nano-structured anode does not have functional groups to capture the returning lithium ions, at least the huge surface areas can still serve as a supporting substrate onto which massive amounts of lithium ions can electro-deposit concurrently. Such a massive, simultaneous deposition cannot be accomplished with the anode current collector alone which has a low specific surface area.

The internal structure of a conventional lithium-ion battery may be schematically shown in FIG. 1(A). In a battery discharge situation, lithium ions must diffuse out of an anode active material particle, such as graphite, silicon, and lithium titanate (particle diameter=$d_a$ and the average solid-state diffusion distance=$d_a/2$), and then diffuse in liquid electrolyte across the anode thickness (anode layer thickness=La and the average diffusion distance=La/2). Subsequently, lithium ions must move (in liquid electrolyte) across a porous separator (thickness=Ls), diffuse across part of the cathode thickness (thickness=Lc) in liquid electrolyte to reach a particular cathode active material particle (average diffusion distance=Lc/2), and then diffuse into the bulk of a particle (diameter=$d_c$ and the average solid-state diffusion distance required=$d_c/2$). In a re-charge situation, the lithium ions move in the opposite direction, but must travel approximately the same distances. It may be noted that, in general, diffusion through a liquid is fast and diffusion through a solid is slow. The differences in diffusion rates are one important factor that differentiates the new battery device from the conventional lithium ion battery.

Assume that the diffusion coefficient of Li ions in a particular medium is D and a required travel distance is x, then the required diffusion time will be $t \sim x^2/D$, according to a well-known kinetics equation. As a first-order of approximation, the total required time scale for a lithium ion to complete a charge or discharge process may be given as:

$$t_{total} = (La/2)^2/D_{electrolyte} + (d_a/2)^2/D_a + (Ls)^2/D_s + (Lc/2)^2/D_{electrolyte} + (d_c/2)^2/D_c \quad (1)$$

where $D_{electrolyte}$=Li ion diffusion coefficient in electrolyte, $D_a$=Li ion diffusion coefficient in an anode active material particle, $D_s$=Li ion diffusion coefficient through a porous separator, and $D_c$=Li ion diffusion coefficient in a cathode active material particle.

Representative diffusion coefficients of $Li^+$ in or through various liquid mediums or solid membrane or particles are given below (based on open literature data): liquid electrolyte ($2 \times 10^{-6}$ $cm^2/s$); separator ($7.5 \times 10^{-7}$ $cm^2/s$); $LiFePO_4$ cathode ($10^{-13}$ $cm^2/s$); $Li_3V_2(PO_4)_3$ cathode ($10^{-13}$ to $10^{-9}$ $cm^2/s$); nano-Si anode ($10^{-12}$ $cm^2/s$); graphite anode ($1-4 \times 10^{-10}$ $cm^2/s$); and $Li_4Ti_5O_{12}$ anode ($1.3 \times 10^{-11}$ $cm^2/s$). This implies that, for a conventional lithium ion battery cell wherein $LiFePO_4$ particles are used as a cathode active material, the final term, $(d_c/2)^2/D_c$, in Eq. (1) dominates the required total diffusion time due to its excessively low diffusion coefficient. Actually, the value of diffusion coefficient varies between $10^{-10}$ and $10^{-16}$ $cm^2/s$, depending on the lithium content in solid solution $Li_xFePO_4$ and $Li_{1-x}FePO_4$ (X<0.02) or the $LiFePO_4/FePO_4$ phase ratio.

In contrast, in a first type of prior art super-battery containing a meso-porous cathode of a functionalized nano carbon material (e.g., graphene, CNT, or disordered carbon) and a lithium metal foil as the anode (schematically illustrated in FIG. 1(C)), Li ions do not have to diffuse through a solid-state cathode particle and, hence, are not subject to the limitation by a low solid-state diffusion coefficient at the cathode (e.g. $10^{-13}$ $cm^2/s$ in a $LiFePO_4$ particle). Instead, the cathode active materials are highly porous, allowing liquid electrolyte to reach the interior of the pores where the functional groups are present to readily and reversibly react with lithium ions that diffuse into these pores through a liquid medium (not a solid medium) with a high diffusion coefficient (e.g., $2 \times 10^{-6}$ cm$^2$/s). In such a super-battery, the final term, $(d_c/2)^2/D_c$, in Eq. (1) is practically non-existing. The required total diffusion time is now dictated by the thicknesses of the electrodes and the separator. The above discussion is based on the premise that the reversible reaction between a functional group and a lithium ion in the electrolyte is fast, and the whole charge-discharge process is not reaction-controlled.

In a second type of prior art super-battery, the cathode is a meso-porous structure of a functionalized nano carbon material (e.g., graphene, CNT, or disordered carbon), but lithium titanate (fine powder) constitutes the anode (schematically illustrated in FIG. 1(B)). In a battery discharge situation, lithium ions must diffuse out of lithium titanate particles, and then diffuse in liquid electrolyte across the anode thickness. Subsequently, lithium ions must move (in liquid electrolyte) across a porous separator, diffuse across part of the cathode thickness in liquid electrolyte to reach a particular surface-borne functional group of a nano-structured cathode active material. There is no need for solid-state diffusion at the cathode side. The whole process is essentially dictated by the solid-state diffusion at the anode. Hence, this second type of prior art super-battery should exhibit a slower kinetic process (hence, a lower power density) as compared to the first type of super-battery. This is indeed consistent with what was observed in our earlier patent application [U.S. Ser. No. 12/924,211 (Sep. 23, 2010)].

By plugging representative values of the various parameters in Eq. (1) we obtain the total lithium diffusion time required of a battery charge or discharge process for several conventional lithium-ion battery types and several prior art lithium super-battery cells. The first group is a conventional lithium-ion battery with a graphite particle anode and lithium iron phosphate cathode (Gr/LiFePO$_4$). The second and third groups are both conventional Li-ion batteries with a LiFePO$_4$ cathode and a Si particle- or lithium titanate-based anode, respectively (Nano-Si/LiFePO$_4$ and Li$_4$Ti$_5$O$_{12}$/LiFePO$_4$). The fourth group is the second type of prior art lithium super-battery (Li$_4$Ti$_5$O$_{12}$/f-CNM) where the anode is composed of Li$_4$Ti$_5$O$_{12}$ particles and the cathode is functionalized carbon nano material (f-CNM), such as graphene, CNT, or disordered carbon. The fifth group is the first type of prior art lithium super-battery (Li foil/f-CNM) where the anode is a lithium foil and the cathode is functionalized carbon nano material. These data are shown in Table 1(a) and (b) below:

TABLE 1a

Parameters used in the present calculations (CNM = carbon nano materials, including carbon nanotubes (CNTs), nano graphene platelets (NGPs), disordered carbon, etc; Gr = graphite).

| Cell Type (Anode/Cathode) | $D_{li}$ in Electrolyte cm$^2$/s | La (um) | Anode particle Dia., da (um) | $D_{li}$ in anode particle cm$^2$/s | Sep. thick. (um) | $D_{li}$ in separator cm$^2$/s | Lc (um) | Cathode particle Dia., dc (um) | $D_{li}$ in cathode particle cm$^2$/s | Total diffusion time (sec) |
|---|---|---|---|---|---|---|---|---|---|---|
| Gr/LiFePO$_4$ | 1.00E-06 | 200 | 20 | 2.00E-10 | 100 | 7.50E-07 | 200 | 1 | 1.0E-13 | 3.02E+04 |
| Gr/LiFePO$_4$-nano | 1.00E-06 | 200 | 20 | 2.00E-10 | 100 | 7.50E-07 | 200 | 0.1 | 1.0E-13 | 5.48E+03 |
| Gr/LiFePO$_4$-nano | 1.00E-06 | 200 | 1 | 2.00E-10 | 100 | 7.50E-07 | 200 | 0.1 | 1.0E-13 | 4.96E+02 |
| Nano-Si/LiFePO$_4$ | 1.00E-06 | 200 | 0.1 | 1.00E-12 | 100 | 7.50E-07 | 200 | 0.1 | 1.0E-13 | 5.08E+02 |
| Li$_4$Ti$_5$O$_{12}$/LiFePO$_4$ | 1.00E-06 | 200 | 0.1 | 1.30E-11 | 100 | 7.50E-07 | 200 | 0.1 | 1.0E-13 | 4.85E+02 |
| Li$_4$Ti$_5$O$_{12}$/LiFePO$_4$ | 1.00E-06 | 100 | 0.05 | 1.30E-11 | 50 | 7.50E-07 | 100 | 0.05 | 1.0E-13 | 1.21E+02 |
| Li$_4$Ti$_5$O$_{12}$/f-CNM | 1.00E-06 | 200 | 0.1 | 1.30E-11 | 100 | 7.50E-07 | 200 | 0.1 | 1.0E-6 | 2.35E+02 |
| Li$_4$Ti$_5$O$_{12}$/f-CNM | 1.00E-06 | 20 | 0.1 | 1.30E-11 | 20 | 7.50E-07 | 20 | 0.1 | 1.0E-6 | 5.26E+00 |
| Li$_4$Ti$_5$O$_{12}$/f-CNM | 1.00E-06 | 2 | 0.1 | 1.30E-11 | 2 | 7.50E-07 | 2 | 0.1 | 1.0E-6 | 1.96E+00 |
| Li$_4$Ti$_5$O$_{12}$/f-CNM | 1.00E-06 | 2 | 0.1 | 1.30E-11 | 2 | 1.00E-06 | 0.2 | 0.1 | 1.0E-6 | 1.94E+00 |
| Li foil/f-CNM | 1.00E-06 | 10 | 0 | 1.30E-11 | 10 | 7.50E-07 | 0.3 | 0.1 | 1.0E-6 | 5.84E-01 |
| Li foil/f-CNM | 1.00E-06 | 10 | 0 | 1.30E-11 | 10 | 7.50E-07 | 3 | 0.1 | 1.0E-6 | 6.06E-01 |
| Li foil/f-CNM | 1.00E-06 | 30 | 0 | 1.30E-11 | 10 | 7.50E-07 | 30 | 0.1 | 1.0E-6 | 4.83E+00 |
| Li foil/f-CNM | 1.00E-06 | 30 | 0 | 1.30E-11 | 10 | 7.50E-07 | 200 | 0.1 | 1.0E-6 | 1.03E+02 |

TABLE 1b

The required diffusion time to reach a particle in the anode ($t_{La}$), diffusion in the anode particle (ta), diffusion time through the separator (ts), diffusion time to reach a cathode particle ($t_{Lc}$), and the diffusion time in the cathode particle (tc).

| $t_{La}$ (sec) | Ta (sec) | ts (sec) | $t_{Lc}$ (sec) | tc (sec) | Total time (sec) | Total time (hours) | Cell type |
|---|---|---|---|---|---|---|---|
| 1.00E+02 | 5.00E+03 | 3.33E+01 | 1.00E+02 | 1.39E+05 | 3.02E+04 | 8.40 | Gr/LiFePO$_4$ |
| 1.00E+02 | 5.00E+03 | 3.33E+01 | 1.00E+02 | 1.39E+03 | 5.48E+03 | 1.52 | Gr/LiFePO$_4$-nano |
| 1.00E+02 | 1.25E+01 | 3.33E+01 | 1.00E+02 | 1.39E+03 | 4.96E+02 | 0.138 | Gr/LiFePO$_4$-nano |
| 1.00E+02 | 2.50E+01 | 3.33E+01 | 1.00E+02 | 1.39E+03 | 5.08E+02 | 0.141 | Nano-Si/LiFePO$_4$-n |
| 1.00E+02 | 1.92E+00 | 3.33E+01 | 1.00E+02 | 1.39E+03 | 4.85E+02 | 0.135 | Li$_4$Ti$_5$O$_{12}$/LiFePO$_4$-n |
| 2.50E+01 | 4.81E-01 | 8.33E+00 | 2.50E+01 | 3.47E+02 | 1.21E+02 | 0.00337 | Li$_4$Ti$_5$O$_{12}$/LiFePO$_4$-n |
| 1.00E+02 | 1.92E+00 | 3.33E+01 | 1.00E+02 | 2.50E-05 | 2.35E+02 | 6.53E-02 | Li$_4$Ti$_5$O$_{12}$/f-CNM |
| 1.00E+00 | 1.92E+00 | 1.33E+00 | 1.00E+00 | 2.50E-05 | 5.26E+00 | 1.46E-03 | Li$_4$Ti$_5$O$_{12}$/f-CNM |
| 1.00E-02 | 1.92E+00 | 1.33E-02 | 1.00E-02 | 2.50E-05 | 1.96E+00 | 5.43E-04 | Li$_4$Ti$_5$O$_{12}$/f-CNM |
| 1.00E-02 | 1.92E+00 | 1.00E-02 | 1.00E-04 | 2.50E-05 | 1.94E+00 | 5.40E-04 | Li$_4$Ti$_5$O$_{12}$/f-CNM |
| 2.50E-01 | 0.00E+00 | 3.33E-01 | 2.25E-04 | 2.50E-05 | 5.84E-01 | 1.62E-04 | Li foil/f-CNM |
| 2.50E-01 | 0.00E+00 | 3.33E-01 | 2.25E-02 | 2.50E-05 | 6.06E-01 | 1.68E-04 | Li foil/f-CNM |
| 2.25E+00 | 0.00E+00 | 3.33E-01 | 2.25E+00 | 2.50E-05 | 4.83E+00 | 1.34E-03 | Li foil/f-CNM |
| 2.25E+00 | 0.00E+00 | 3.33E-01 | 1.00E+02 | 2.50E-05 | 1.03E+02 | 2.85E-02 | Li foil/f-CNM |

Several significant observations can be made from the data of Table 1(a) and (b):
(1) Conventional lithium ion batteries (first group above) featuring a micron-sized graphite particle anode (graphite diameter=20 μm) and a micron-sized $LiFePO_4$ (particle diameter=1 μm) would require several hours (e.g. 8.4 h) to complete the required lithium ion diffusion process. This is why conventional lithium ion batteries exhibit very low power densities (typically 100-500 W/Kg).
(2) This problem of a long diffusion time can be partially alleviated by using nano-scaled particles, as in the second and third groups above (e.g., 8 minutes if both the anode and cathode active material particles have a diameter of 100 nm).
(3) In contrast, for the second type of prior art lithium super-batteries featuring a functionalized carbon cathode (e.g. f-CNT, f-NGP, or f-disordered carbon) and an anode of $Li_4Ti_5O_{12}$ nano particles, the required diffusion times are between 235 sec (<4 minutes) for a cathode thickness of 200 μm and 1.96 sec for an ultra-thin cathode (e.g., 0.3 μm LBL f-CNT as prepared by the layer-by-layer method of the MIT research group [S. W. Lee, et al, *Nature Nanotechnology*, 5 (2010) 531-537]). This is 2-3 orders of magnitude faster than the conventional lithium-ion batteries with both the anode and cathode particles having a diameter of 100 nm.
(4) For the lithium super-batteries, the electrode thickness is a dominating factor. For instance, in the case of using lithium metal foil as the anode (first type), the total diffusion time can be as short as <0.6 sec (when the cathode thickness is 0.3 μm or 3 μm), which increases to 103 sec (still less than 2 minutes) when the cathode thickness is 200 μm.
(5) The above observations imply that the lithium super-batteries should have an extraordinary power density, particularly when the electrodes are ultra-thin. This is why Lee, et al. at MIT were able to report a power density >>100 Kw/Kg for their lithium super-battery cells having a LBL f-CNT cathode of 0.3 μm thick. However, a useful electrode size is at least 50 μm in thickness (typically between 100 and 300 μm) and the cells with a cathode thickness of 0.3-3.0 μm have very limited practical utility value. The exceptionally high power densities observed for the lithium super-batteries with a LBL f-CNT cathode reported by Lee, et al are due to the ultra-thin cathode thickness (0.3 μm). This is not just a speculation and, as a matter of fact, the data in Fig. S7 of Lee, et al asserted that the power density of their f-CNT super-batteries dropped by an order of magnitude when the cathode thickness was increased from 0.3 μm to 3 μm. Although Lee, et al did not provide any data on a thicker f-CNT electrode-based super-battery (e.g., cathode thickness of 200 μm), one can reasonably expect that the power density should be further reduced by 1-2 orders of magnitude.
(6) Although to a lesser extent, the energy density of super-batteries with a functionalized nano carbon cathode should also be dependent upon the electrode thickness. For instance, the data reported by the MIT group [Lee, et al] indicate that, given comparable scan rates (current densities), the energy density of a super-battery decreases significantly (up to 30%) when the LBL CNT cathode thickness increases from 0.3 to 3 μm.

It may be noted that the above calculations for the super-batteries containing a lithium foil as the anode are applicable to the instant surface controlled battery device as well, with the exception that the lithium foil thickness may be replaced with the thickness of a nano-structured anode. The lithium source (lithium particles or pieces of lithium foil) would not add additional anode thickness value in the time calculations since the nano-structured anode is "elastic" or compressible. The lithium foil may be compressed against the nano-structured anode, or the lithium particles may be incorporated in the nano-structured anode when the battery device is made. Once lithium particles or foil are ionized during the first discharge cycle, the nano-structured anode (e.g. NGP or CNT-based mat) would snap back to touch the separator. Based on the above calculations, the required diffusion times for the super-battery and those for the surface-controlled battery should be approximately the same. Then, why would the surface-controlled battery be better than the super-battery with a lithium foil alone as the anode (without the nano-structured CNT or NGP)?

Surface-Controlled Battery Device Versus Prior Art Lithium Super-Battery

It may be noted that, for the first type of prior art lithium super-battery (Li foil/f-CNM) where the anode is a lithium foil, there is no anode particle and, hence, no particle diameter ($d_a$ was assigned as zero in the above calculation). During the first discharge, Li foil is electrochemically ionized to release ions. In the above calculations, this surface-controlled reaction was assumed to be fast and not rate-limiting. In reality, this surface reaction can become rate-limiting when a high discharge rate is required (i.e. when the external circuit or load demands a high current density). This limitation may not be controlled by the surface ionization rate itself, but instead by the limited amount of surface area of the lithium foil during the first discharge cycle. In other words, at a given moment of time during the first discharge, there is only so much surface area from which lithium ions can be released simultaneously.

During the re-charge cycle, lithium ions move back from the cathode to the anode side, trying to re-deposit onto a surface of the anode current collector (e.g. a copper foil), which is the only surface available at the anode of a super-battery. There are two serious issues associated with using a current collector alone to accommodate the in-flux of lithium ions during re-charge:
(1) If the re-charge rate is high (with a high current density), the huge numbers of lithium ions that rapidly migrate back to the anode side are all trying to deposit simultaneously onto the surface of a current collector, which typically has a very low surface area (specific surface area typically <<1 $m^2/g$). This limited surface area becomes deposition rate-limiting.
(2) If the re-charge rate is low (with a low current density), the returning lithium ions would find a way to deposit onto the current collector surface in a non-uniform manner. Certain favorable spots will receive more deposited lithium atoms first, and these spots could continue to be deposited at a higher rate. Such a non-uniform lithium deposition could lead to the formation of dendrites at the anode, which could grow longer and longer as the number of cycles increases, and eventually penetrate through the separator to reach the cathode side, causing internal shorting. This possibility could pose a similar problem that plagued the lithium metal battery industry in late 1980s and eventually resulted in the termination of essentially all the lithium metal cell productions in early 1990s. We would not want to see this potential internal shorting problem lead to the same disastrous result.

After an extensive and in-depth study, the applicants have solved these two issues by implementing a nano-structured anode between an anode current collector and a porous separator. This nano-structured anode is preferably composed of a nano carbon material having a high specific surface area, such as the nano graphene platelet (NGP, single-layer graphene or multi-layer graphene), carbon nano-tube (single-walled or multi-walled), carbon nano-fiber (vapor-grown, electro-spun polymer derived, etc), disordered carbon, metal nano-wire, conductive nano-wire, etc. The specific surface area of this nano-structured anode is preferably greater than 100 $m^2/g$, more preferably greater than 500 $m^2/g$, further preferably greater than 1,000 $m^2/g$, and most preferably greater than 1,500 $m^2/g$. This nano-structured material preferably has a functional surface having thereon a functional group that reversibly reacts with a lithium atom or ion.

It is very surprising for us to observe that the implementation of this nano-structured anode significantly increases not only the power density (Kw/Kg), but also the energy density (Wh/Kg) of the presently invented surface-controlled, lithium ion-exchanging battery device. We were really very surprised to observe these highly significant observations (presented in the Examples of this specification). Not wishing to be limited by the theory, but we believe that this newly implemented nano-structured anode plays at least the following three roles:

(1) During the re-charge cycle, the massive surface areas of this nano-structured anode enable huge numbers of lithium ions to be rapidly deposited simultaneously in a high current density situation (high charge rate). This makes it possible for the battery device to be re-charged in seconds or fractions of a second. This has not been possible with any prior art lithium metal or lithium ion battery, or any prior art lithium super-battery.

(2) During the first discharge operation of a freshly made surface-controlled battery device of the instant invention, the lithium foil or lithium particles get ionized, releasing lithium ions at the anode which travel into the cathode side and get captured by the functional material surface of the cathode. Upon re-charging, these lithium ions return to the anode and uniformly deposit onto the massive surfaces of the nano-structured anode, forming an ultra-thin coating of lithium (possibly mono-layer) thereon. Such a huge surface area of lithium-decorated functional surfaces enables simultaneous release of great amounts of lithium ions during subsequent discharge cycles. This concurrent, massive releasing of lithium ions had not been possible in a battery with an anode current collector alone whose specific surface area is normally much less than 1 $m^2/g$. The high specific surface area of the nano-structured anode, >>100 $m^2/g$, enables both fast charging and fast discharging, achieving an unprecedented power density.

(3) The nano-structured anode, electronically connected to a current collector, also provides a uniform electric field in the anode space, allowing the returning lithium ions to more homogeneously deposit onto the surface of nano materials (e.g. graphene). Since huge surface areas are available for this purpose, only an extremely small amount of lithium is deposited onto any single spot, insufficient for the growth of a dendrite. These reasons imply that the presently invented surface-controlled battery device is a safer energy storage device.

Surface-Controlled Battery Device Versus Prior Art Supercapacitors

This new surface-controlled, lithium ion-exchanging battery device is also patently distinct from the conventional supercapacitor based on the electric double layer (EDL) mechanism or pseudo-capacitance mechanism. In both mechanisms, no lithium ions are exchanged between the two electrodes. In particular, our new battery device is patently distinct from the LBL CNT-based symmetric supercapacitor of Lee, et al [*Nature Nanotechnology*, 5 (2010) 531-537], wherein both the anode and the cathode are ultra-thin CNT structures prepared by the layer-by-layer (LBL) process. This symmetric supercapacitor does not contain an extra lithium source and does not involve exchange of lithium ions between two electrodes.

Nano-structured materials for use in the anode or cathode of the instant invention may preferably contain nano graphene platelet (NGP), carbon nano-tube (CNT), or disordered carbon. These nano-structured carbon materials can be used as a supporting substrate for other organic or polymeric functional materials that have useful functional groups (e.g., carbonyl) but are not electrically conducting. The CNT is a better known material in the nano material industry and, hence, will not be further discussed herein. What follows is a description of NGP and nano-structured disordered carbon:

Nano Graphene Platelet (NGP)

The applicant's research group was the first in the world to discover single-layer graphene [B. Z. Jang and W. C. Huang, "Nano-scaled Graphene Plates," U.S. patent application Ser. No. 10/274,473 (Oct. 21, 2002); now U.S. Pat. No. 7,071,258 (Jul. 4, 2006)] and the first to use graphene for supercapacitor [L. Song, A. Zhamu, J. Guo, and B. Z. Jang "Nano-scaled Graphene Plate Nanocomposites for Supercapacitor Electrodes" U.S. patent application Ser. No. 11/499,861 (Aug. 7, 2006), now U.S. Pat. No. 7,623,340 (Nov. 24, 2009)], and for lithium-ion battery applications [A. Zhamu and B. Z. Jang, "Nano Graphene Platelet-Based Composite Anode Compositions for Lithium Ion Batteries," U.S. patent application Ser. No. 11/982,672 (Nov. 5, 2007), now U.S. Pat. No. 7,745,047 (Jun. 29, 2010)].

For the purpose of defining the geometry of an NGP, the NGP is described as having a length (the largest dimension), a width (the second largest dimension), and a thickness. The thickness is the smallest dimension, which is no greater than 100 nm and, in the present application, no greater than 10 nm (preferably no greater than 5 nm). The NGP may be single-layer graphene. When the platelet is approximately circular in shape, the length and width are referred to as diameter. In the presently defined NGPs, there is no limitation on the length and width, but they are preferably smaller than 10 μm and more preferably smaller than 1 μm. We have been able to produce NGPs with length smaller than 100 nm or larger than 10 μm. The NGP can be pristine graphene (with essentially 0% oxygen content) or graphene oxide (with up to approximately 45% by weight oxygen). Graphene oxide can be thermally or chemically reduced to become reduced graphene oxide (typically with an oxygen content of 1-20%). For use in the anode and/or the cathode of the lithium super-battery, the oxygen content is preferably in the range of 5% to 30% by weight, and more preferably in the range of 10% to 30% by weight.

Figure 5:
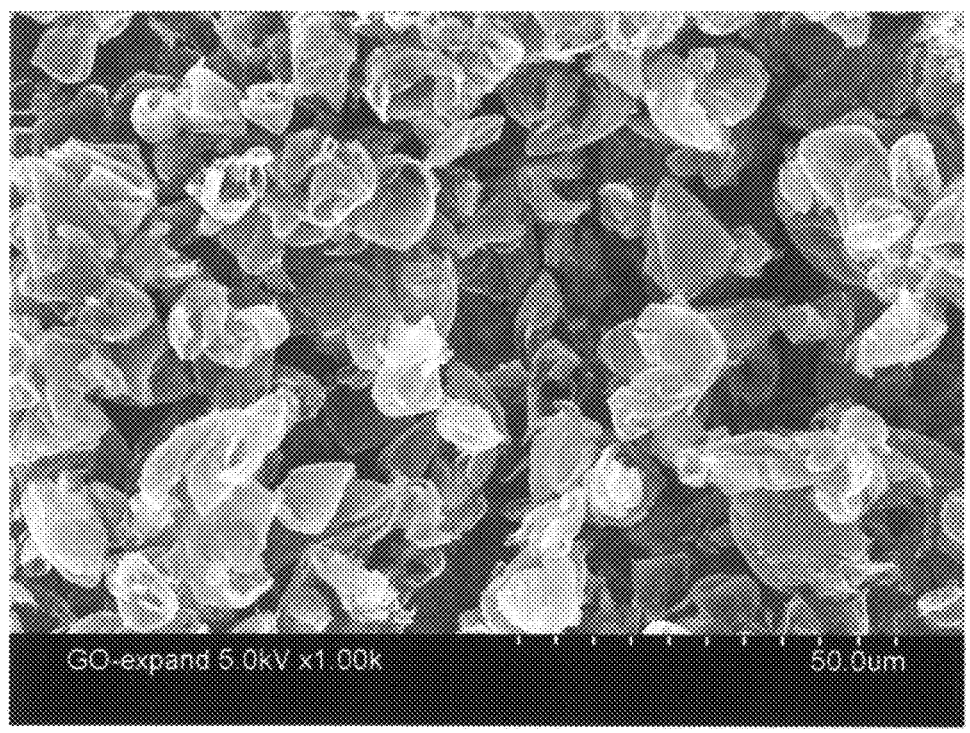
FIG. 5 A SEM image of curved nano graphene sheets.

Despite the fact that individual graphene sheets have an exceptionally high specific surface area, flat-shaped graphene sheets prepared by conventional routes have a great tendency to re-stack together or overlap with one another, thereby dramatically reducing the specific surface area that is accessible by the electrolyte. FIG. 5 shows a new breed of graphene that is herein referred to as the curved graphene platelet or sheet. Curved NGPs are capable of forming a meso-porous structure having a desired pore size range (e.g. slightly >2 nm) when they were stacked together to form an electrode. This size range appears to be conducive to being accessible by the commonly used lithium-containing electrolytes.

The curved NGPs may be produced by using the following recommended procedures:

(a) dispersing or immersing a laminar graphite material (e.g., natural graphite powder) in a mixture of an intercalant and an oxidant (e.g., concentrated sulfuric acid and nitric acid, respectively) to obtain a graphite intercalation compound (GIC) or graphite oxide (GO);

(b) exposing the resulting GIC or GO to a thermal shock, preferably in a temperature range of 600-1,100° C. for a short period of time (typically 15 to 60 seconds), to obtain exfoliated graphite or graphite worms (some oxidized NGPs with a thickness <100 nm could be formed at this stage if the intercalation/oxidation step was allowed to proceed for a sufficiently long duration of time; e.g. >24 hours);

(c) dispersing the exfoliated graphite to a liquid medium containing a functionalizing agent (e.g., an oxidizing agent such as sulfuric acid, nitric acid, hydrogen peroxide or, preferably, carboxylic acid, formic acid, etc., which is a source of —COOH group) to form a suspension. Stirring, mechanical shearing, or ultrasonication, and/or temperature can be used to break up graphite worms to form separated/isolated NGPs and/or to help attach desired functional groups to the oxidized NGPs, resulting in the formation of functionalized NGPs. The functionalizing agent may be an amine- or —$NH_2$-containing group, as used in several common curing agents for epoxy resins; and, optionally, (d) aerosolizing the graphene-liquid solution into liquid droplets containing chemically functionalized single or multiple NGPs while concurrently removing the liquid to recover curved NGPs containing desired functional groups. Without the aerosolizing step, the resulting functionalized graphene platelets tend to be flat-shaped.

It may be noted that steps (a) to (b) are the most commonly used steps to obtain exfoliated graphite and graphene oxide platelets in the field. Step (c) is designed for imparting additional functional groups to NGPs. Step (d) is essential to the production of curved graphene sheets. Oxidized NGPs or GO platelets may be chemically reduced to recover conductivity properties using hydrazine as a reducing agent, before, during, or after chemical functionalization.

The carboxylic acids, being environmentally benign, are particularly preferred functionalizing agents for imparting carbonyl or carboxylic groups to NGPs. The carboxylic acid may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. Preferably, the carboxylic acid is selected from the group consisting of saturated aliphatic carboxylic acids of the formula $H(CH_2)_nCOOH$, wherein n is a number of from 0 to 5, including formic, acetic, propionic, butyric, pentanoic, and hexanoic acids, anydrides thereof, reactive carboxylic acid derivatives thereof, and combinations thereof. The most preferred carboxylic acids are formic acid and acetic acid.

The NGPs used in the aforementioned electrode may be subjected to the following treatments, separately or in combination, before or after the functionalization operation:

(i) chemically functionalized with a different functional group. Other useful surface functional groups may include quinone, hydroquinone, quaternized aromatic amines, or mercaptans;

(ii) coated or grafted with a polymer that contains a desired functional group (e.g., carbonyl group);

(iii) subjected to an activation treatment (analogous to activation of carbon black materials) to create additional surfaces and possibly imparting functional chemical groups to these surfaces. The activation treatment can be accomplished through $CO_2$ physical activation, KOH chemical activation, or exposure to nitric acid, fluorine, or ammonia plasma.

The above-described processes produce graphene oxide platelets or oxidized NGPs. The heavy oxidation step involved in these processes intrinsically introduces oxygen-containing groups to both the edge surfaces and the basal plane surfaces (top and bottom surfaces) of an NGP. This can be good or bad. On the one hand, we would like to create as many functional groups as possible to maximize the lithium-capturing capacity. But, on the other hand, the functional groups on the basal or graphene plane necessarily inflict damage to the plane and significantly reduce the over-all conductivity of an NGP. The formation of functional groups in this manner, without step (c) above, is not a well-controlled process.

Fortunately, after very diligent research work, we have discovered an alternative way to impart functional groups to NGPs in a more controlled manner. This new way involves producing pristine NGPs without going through the conventional chemical intercalation/oxidation procedure. The produced non-oxidized graphene (naturally having edge surfaces being more chemically active) is then subjected to controlled oxidation or controlled functionalization. We have surprisingly found that functional groups were attached to the edge surfaces first and essentially exhausted the active sites at the edge surfaces before any significant amount of functional groups began to attach themselves to the basal planes.

In 2007, we reported a direct ultrasonication method of producing pristine nano graphene directly from graphite particles dispersed in a surfactant-water suspension [A. Zhamu, et al, "Method of Producing Exfoliated Graphite, Flexible Graphite, and Nano-Scaled Graphene Plates," U.S. patent application Ser. No. 11/800,728 (May 8, 2007)]. This method entails dispersing natural graphite particles in a low surface tension liquid, such as acetone or hexane. The resulting suspension is then subjected to direct ultrasonication for 10-120 minutes, which produces graphene at a rate equivalent to 20,000 attempts to peel off graphene sheets per second per particle. The graphite has never been intercalated or oxidized and, hence, requires no subsequent chemical reduction. This method is fast, environmentally benign, and can be readily scaled up, paving the way to the mass production of pristine nano graphene materials. The same method was later studied by others and now more commonly referred to as the "liquid phase production." Once pristine graphene is produced, the material is then exposed to an oxidation or functionalization treatment using, for example, a gaseous-phase or liquid acid or acid mixture. The pristine NGPs may also be immersed in carboxylic acids at a desired temperature for a period of time to obtain NGPs with a desired level of functionalization.

Specifically, the oxidation treatment comprises subjecting the pristine NGP material to an oxidizing agent preferably selected from ozone, sulfonic ($SO_3$) vapor, an oxygen-containing gas, hydrogen peroxide vapor, nitric acid vapor, or a combination thereof. Preferably, the treatment comprises subjecting the pristine NGP material to an oxidizing agent in a hydrogen-containing environment. Although oxidation treatment can be conducted by immersing NGPs in a liquid acid and/or oxidizer environment, such a procedure requires a subsequent water-rinsing and purification step (such a rinsing procedure is not as tedious as required in the case of conventional sulfuric acid-intercalation graphite, nevertheless). Hence, a gaseous treatment requiring no post-treatment rinsing is preferred.

A primary goal of the oxidation treatment is to impart a desired amount of functional groups to pristine NGPs without a significant compromise in electrical conductivity. After an extensive and in-depth study we have come to discover that conductive functionalized NGPs can be produced with an oxygen content no greater than 25% by weight, preferably between 5% and 25% by weight. Presumably, a majority of the functional groups are located at the edge surfaces of NGPs since the electrical conductivity would not be significantly reduced. Beyond 25% of over-all oxygen content, functional groups begin to appear on graphene plane surfaces, interrupting electron-conducting paths. The oxygen contents were determined using chemical elemental analysis and X-ray photoelectron spectroscopy (XPS).

The partially oxidized NGPs prepared according to a preferred embodiment of the present invention can be further functionalized by carrying out an additional step of contacting the partially oxidized NGPs with a reactant so that a functional group is added to a surface or edge of the nano graphene platelet. The functional group may contain alkyl or aryl silane, alkyl or aralkyl group, hydroxyl group, amine group, fluorocarbon, or a combination thereof.

The NGPs, after a partial oxidation treatment, will have a reactive graphene surface (RGS) or reactive graphene edge (RGE). They can be prescribed to undergo the following reactions:

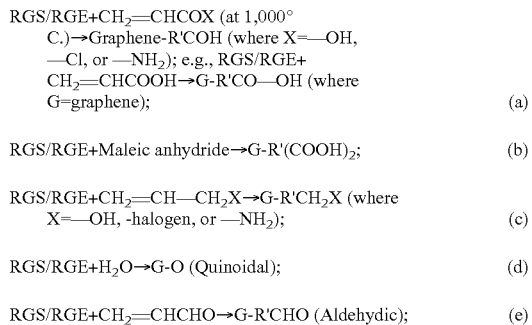

In the above-listed reactions, R' is a hydrocarbon radical (alkyl, cycloalkyl, etc). Partial oxidation of pristine NGPs can lead to the attachment of some functional groups on a surface or at an edge of a graphene plane, including carboxylic acid and hydroxyl groups. A large number of derivatives can be prepared from carboxylic acid alone. For instance, alcohols or amines can be easily linked to acid to provide stable esters or amides.

Any reaction capable of attaching carbonyl ($>C=O$) or amine ($-NH_2$) group to the graphene edge or basal plane surface may be used for practicing the instant invention.

Nano-Structured Disordered Carbon

Figure 3:
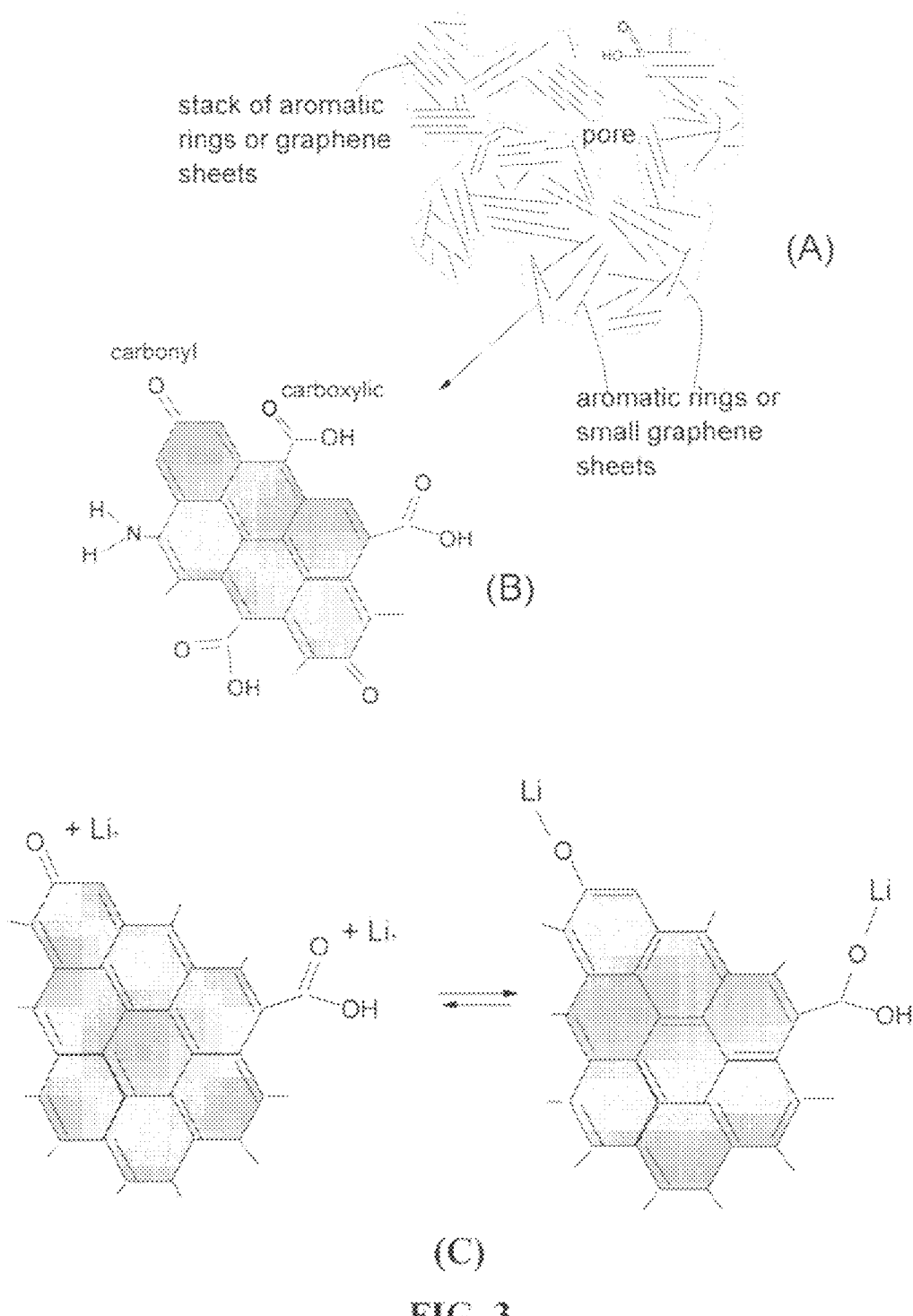
FIG. 3 (A) Schematic of a typical structure of a disordered carbon (as an example of a nano-structured functional material) that is highly porous with pores accessible by liquid electrolyte in such a manner that the functional groups attached to an edge or surface of an aromatic ring or small graphene sheet can readily react with the lithium ions; (B) Examples of functional groups capable of reversibly reacting with lithium ions. Lithium ions are not required to enter the interior of a solid particle (no solid state diffusion is necessary), as opposed to a conventional lithium-ion battery wherein lithium ions must diffuse through a narrow channel of a solid compound (e.g., a $LiFePO_4$ particle); and (C) A possible lithium storage mechanism, which is fast, reversible, and stable.

The disordered carbon material may be selected from a broad array of carbonaceous materials, such as a soft carbon, hard carbon, polymeric carbon (or carbonized resin), mesophase carbon, coke, carbonized pitch, carbon black, activated carbon, or partially graphitized carbon. As schematically illustrated in FIGS. 3(A) and (B), a disordered carbon material is typically formed of two phases wherein a first phase is small graphite crystal(s) or small stack(s) of graphite planes (with typically up to 10 graphite planes or aromatic ring structures overlapped together to form a small ordered domain) and a second phase is non-crystalline carbon, and wherein the first phase is dispersed in the second phase or bonded by the second phase. The second phase is made up of mostly smaller molecules, smaller aromatic rings, defects, and amorphous carbon. The desired functional groups (e.g., —COOH and $NH_2$ groups in FIG. 3(B)) are attached to an edge or plane surface of a aromatic ring structure. Typically, the disordered carbon is highly porous (e.g., activated carbon) or present in an ultra-fine powder form (e.g. carbon black) having nano-scaled features (hence, a high specific surface area).

Figure 4A:
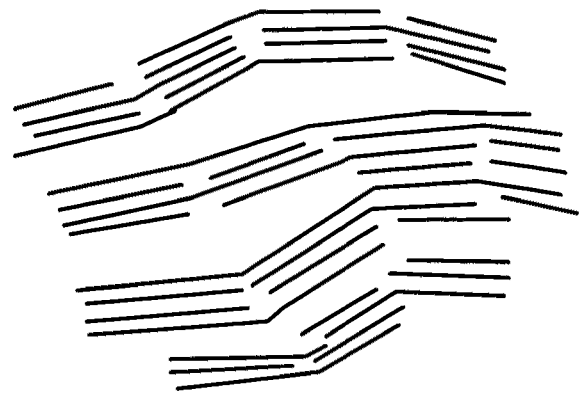
FIG. 4 Examples of disordered carbon that can be used as a nano-structured, functional material at the anode and/or the cathode: (A) Schematic of a soft carbon, wherein neighboring stacks of graphene sheets or small aromatic rings are favorably oriented with respect to each other at a small angle that is conducive to the growth or merging (graphitizable); (B) hard carbon (non-graphitizable); (C) carbon black, having a large number of small aromatic ring domains arranged to form a nano-scaled spherical particle. Preferably, an individual carbon black particle is activated to open up small gates that enable liquid electrolyte to access the edge- or surface-borne functional groups inside a particle, as illustrated in (D).

Soft carbon refers to a carbonaceous material composed of small graphite crystals wherein the orientations of these graphite crystals or stacks of graphene sheets are conducive to further merging of neighboring graphene sheets or further growth of these graphite crystals or graphene stacks (FIG. 4(A)) using a high-temperature heat treatment (graphitization). Hence, soft carbon is said to be graphitizable.

Figure 4B:
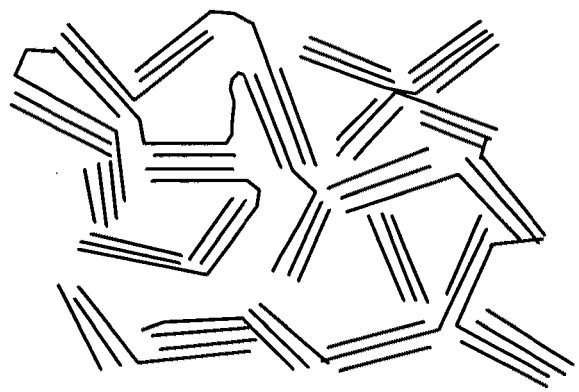

Hard carbon (FIG. 4(B)) refers to a carbonaceous material composed of small graphite crystals wherein these graphite crystals or stacks of graphene sheets are not oriented in a favorable directions (e.g. nearly perpendicular to each other) and, hence, are not conducive to further merging of neighboring graphene sheets or further growth of these graphite crystals or graphene stacks (i.e., not graphitizable).

Figure 4C:
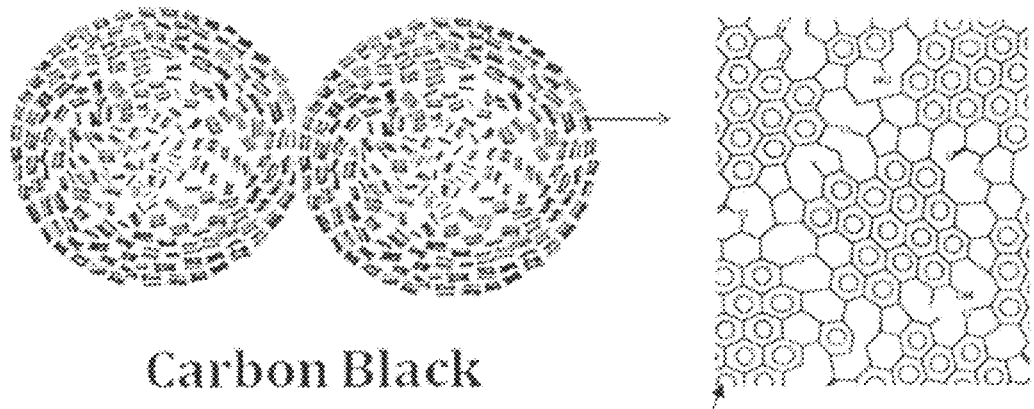
Figure 4D:
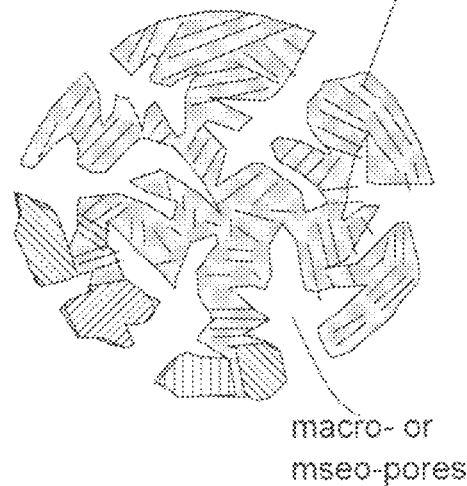

As schematically illustrated in FIG. 4(C), Carbon black (CB), acetylene black (AB), and activated carbon (AC) are typically composed of domains of aromatic rings or small graphene sheets, wherein aromatic rings or graphene sheets in adjoining domains are somehow connected through some chemical bonds in the disordered phase (matrix). These carbon materials are commonly obtained from thermal decomposition (heat treatment, pyrolyzation, or burning) of hydrocarbon gases or liquids, or natural products (wood, coconut shells, etc).

The preparation of polymeric carbons by simple pyrolysis of polymers or petroleum/coal tar pitch materials has been known for approximately three decades. When polymers such as polyacrylonitrile (PAN), rayon, cellulose and phenol formaldehyde were heated above 300° C. in an inert atmosphere they gradually lost most of their non-carbon contents. The resulting structure is generally referred to as a polymeric carbon. Depending upon the heat treatment temperature (HTT) and time, polymeric carbons can be made to be insulating, semi-conducting, or conducting with the electric conductivity range covering approximately 12 orders of magnitude. This wide scope of conductivity values can be further extended by doping the polymeric carbon with electron donors or acceptors. These characteristics uniquely qualify polymeric carbons as a novel, easy-to-process class of electro-active materials whose structures and physical properties can be readily tailor-made.

Polymeric carbons can assume an essentially amorphous structure, or have multiple graphite crystals or stacks of graphene planes dispersed in an amorphous carbon matrix. Depending upon the HTT used, various proportions and sizes of graphite crystals and defects are dispersed in an amorphous matrix. Various amounts of two-dimensional condensed aromatic rings or hexagons (precursors to graphene planes) can be found inside the microstructure of a heat treated polymer such as a PAN fiber. An appreciable amount of small-sized graphene sheets are believed to exist in PAN-based polymeric carbons treated at 300-1,000° C. These species condense into wider aromatic ring structures (larger-sized graphene sheets) and thicker plates (more graphene sheets stacked together) with a higher HTT or longer heat treatment time (e.g., >1,500° C.). These graphene platelets or stacks of graphene sheets (basal planes) are dispersed in a non-crystalline carbon matrix. Such a two-phase structure is a characteristic of some disordered carbon material.

There are several classes of precursor materials to the disordered carbon materials of the instant patent application. For instance, the first class includes semi-crystalline PAN in a fiber form. As compared to phenolic resin, the pyrolized PAN fiber has a higher tendency to develop small crystallites that are dispersed in a disordered matrix. The second class, represented by phenol formaldehyde, is a more isotropic, essentially amorphous and highly cross-linked polymer. The third class includes petroleum and coal tar pitch materials in bulk or fiber forms. The precursor material composition, heat treatment temperature (HTT), and heat treatment time (Htt) are three parameters that govern the length, width, thickness (number of graphene planes in a graphite crystal), and chemical composition of the resulting disordered carbon materials.

In the present investigation, PAN fibers were subjected to oxidation at 200-350° C. while under a tension, and then partial or complete carbonization at 350-1,500° C. to obtain polymeric carbons with various nano-crystalline graphite structures (graphite crystallites). Selected samples of these polymeric carbons were further heat-treated at a temperature in the range of 1,500-2,000° C. to partially graphitize the materials, but still retaining a desired amount of amorphous carbon (no less than 10%). Phenol formaldehyde resin and petroleum and coal tar pitch materials were subjected to similar heat treatments in a temperature range of 500 to 1,500° C. The disordered carbon materials obtained from PAN fibers or phenolic resins are preferably subjected to activation using a process commonly used to produce activated carbon (e.g., treated in a KOH melt at 900° C. for 1-5 hours). This activation treatment is intended for making the disordered carbon meso-porous, enabling chemical functionalizing agents to reach the edges or surfaces of the constituent aromatic rings. The meso-pores will also be accessible to the liquid electrolyte after the battery cell is made. Such an arrangement enables the lithium ions in the liquid to readily react with the functional groups without having to undergo solid-state diffusion.

Certain grades of petroleum pitch or coal tar pitch may be heat-treated (typically at 250-500° C.) to obtain a liquid crystal-type, optically anisotropic structure commonly referred to as meso-phase. This meso-phase material can be extracted out of the liquid component of the mixture to produce meso-phase particles or spheres.

The functionalized disordered carbon may be produced by using the following recommended procedures (as a preferred embodiment):

(e) Physically or chemically activating a desired disordered carbon (e.g. a soft carbon, hard carbon, polymeric carbon or carbonized resin, meso-phase carbon, coke, carbonized pitch, carbon black, activated carbon, or partially graphitized carbon) to obtain activated disordered carbon. For instance, the activation treatment can be accomplished through oxidizing, $CO_2$ physical activation, KOH or NaOH chemical activation, or exposure to nitric acid, fluorine, or ammonia plasma.

(f) dispersing the activated disordered carbon to a liquid medium containing a functionalizing agent (e.g., an oxidizing agent such as sulfuric acid, nitric acid, hydrogen peroxide or, preferably, carboxylic acid, formic acid, etc., which is a source of —COOH group) to form a suspension. Stirring, mechanical shearing, or ultrasonication, and/or temperature can be used to break up the activated disordered carbon particles to accelerate the functionalization of disordered carbon. The functionalizing agent may be an amine- (or —$NH_2$-containing group, as used in several common curing agents for epoxy resins), carboxylic groups (—COOH), or other groups capable of reversibly reacting with lithium; and, optionally, (g) aerosolizing the suspension into liquid droplets containing chemically functionalized disordered carbon particles while concurrently removing the liquid to recover functionalized disordered carbon particles.

The functionalizing procedures for nano-structured disordered carbon are similar to those used for NGPs and, hence, will not be repeated here. In particular, any reaction capable of attaching carbonyl (>C=O) or amine (—$NH_2$) group to the graphene edge or basal plane surface of a disordered carbon material may be used for practicing the instant invention.

Organic and Polymeric Functional Materials Containing Lithium-Reacting Functional Groups Many organic- or polymer-based functional materials may contain pendant functional groups that are capable of rapidly and reversibly reacting with lithium ions in liquid or gel electrolyte. Examples include Poly(2,5-dihydroxy-1,4-benzoquinone-3,6-methylene), $Li_xC_6O_6$ x=1-3), $Li_2(C_6H_2O_4)$, $Li_2C_8H_4O_4$ (Li terephthalate), $Li_2C_6H_4O_4$(Li trans-trans-muconate), 3,4,9,10-perylenetetracarboxylicacid-dianhydride (PTCDA) sulfide polymer, PTCDA, 1,4,5,8-naphthalene-tetracarboxylicacid-dianhydride (NTCDA), Benzene-1, 2,4,5-tetracarboxylic dianhydride, 1,4,5,8-tetrahydroxy anthraquinon, Tetrahydroxy-p-benzoquinone, and combinations thereof. These functional molecules, polymers, or salts normally have a relatively low electronic conductivity making them not amenable to serving as an electrode material by themselves. One exception is sulfur-cross-linked PTCDA (PTCDA sulfide polymer).

Any of these non-conducting functional materials may be preferably combined with (e.g. chemically bonded or attached to) a nano-structured material, such as the NGP, CNT, disordered carbon, nanowire, and nano-fiber. For instance, both graphene and the constituent aromatic rings of a disordered carbon (soft carbon, hard carbon, activated carbon, carbon black, etc) can have, on their edges or surfaces, functional groups that can react with the matting functional groups on the aforementioned functional materials (e.g. the hydroxyl group on Tetrahydroxy-p-benzoquinone). Alternatively, these organic or polymeric functional materials may be simply supported on a surface of a nano-structured material (e.g., graphene or nano-wire surface). The nano-structure material (e.g. graphene and disordered carbon) may be functionalized as well so that it provides not only support for the organic or polymeric material (imparting electric conductivity) but also functional groups capable of reacting with lithium.

The following examples serve to illustrate the preferred embodiments of the present invention and should not be construed as limiting the scope of the invention:

Example 1

Functionalized Soft Carbon (One Type of Disordered Carbon), Soft Carbon-Based Super-Battery and Surface-Controlled Lithium Battery Functionalized soft carbon was prepared from a liquid crystalline aromatic resin. The resin was ground with a mortar, and calcined at 900° C. for 2 h in a $N_2$ atmosphere to prepare the graphitizable carbon or soft carbon. The resulting soft carbon was mixed with small tablets of KOH (four-fold weight) in an alumina melting pot. Subsequently, the soft carbon containing KOH was heated at 750° C. for 2 h in $N_2$. Upon cooling, the alkali-rich residual carbon was washed with hot water until the outlet water reached a pH value of 7. The activated soft carbon was then immersed in a 90% $H_2O_2$-10% $H_2O$ solution at 45° C. for an oxidation treatment that lasted for 2 hours. Then, the resulting partially oxidized soft carbon was immersed in HCOOH at room temperature for functionalization for 24 hours. The resulting functionalized soft carbon was dried by heating at 60° C. in a vacuum oven for 24 hours.

Coin cells using functionalized soft carbon as a cathode and functionalized soft carbon as a nano-structured anode (plus a thin piece of lithium foil as a lithium source implemented between a current collector and a separator layer, Sample-1) were made and tested. The separator is one sheet of micro-porous membrane (Celgard 2500). The current collector for each of the two electrodes is a piece of carbon-coated aluminum foil. The electrode is a composite composed of 85 wt. % functionalized soft carbon (+5% Super-P and 10% PTFE binder coated on Al foil). The electrolyte solution was 1M $LiPF_6$ dissolved in a mixture of ethylene carbonate (EC) and dimethyl carbonate (DMC) with a 3:7 volume ratio. The separator was wetted by a minimum amount of electrolyte to reduce the background current. Cyclic voltammetry and galvanostatic measurements of the lithium cells were conducted using an Arbin 32-channel supercapacitor-battery tester at room temperature (in some cases, at a temperature as low as −40° C. and as high as 60° C.).

As a reference sample (Sample-1-CA), similar coin cells, containing a lithium foil at the anode but without a nano-structured carbon layer, were also made and tested. This is a prior art lithium super-battery. Additionally, a symmetric supercapacitor with both electrodes being composed of the functionalized soft carbon material, but containing no additional lithium source than what is available in the liquid electrolyte, was also fabricated and evaluated (Sample-1-CB). The data was compared to the data of the prior art symmetric supercapacitor (f-LBL-CNT/f-LBL-CNT) of Lee, et al.

Figure 6:
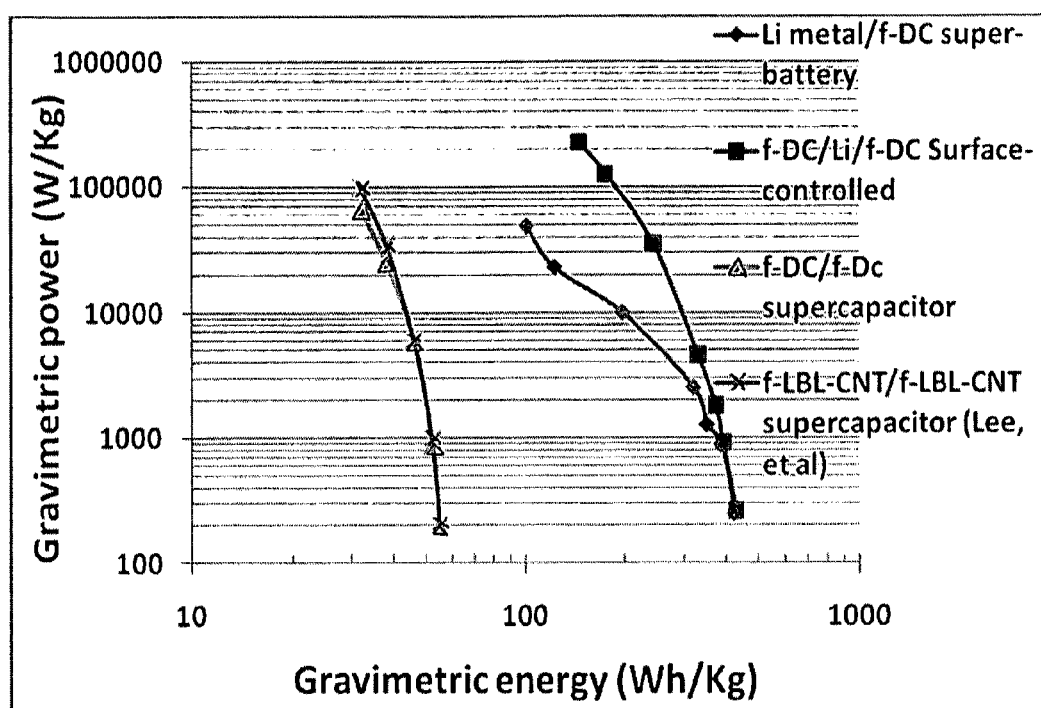
FIG. 6 Ragone plot of four types of cells: a surface-controlled, lithium ion-exchanging battery, a prior art lithium super-battery (formed of a Li metal anode and a functionalized disordered carbon cathode), a prior art symmetric supercapacitor composed of two functionalized disordered carbon electrodes (no lithium foil as a lithium source), and a symmetric supercapacitor based on LBL-CNTs (the data for CNT-based supercapacitor were read off a figure of Lee, et al).

Galvanostatic studies of the super-battery (Sample-1-CA) with such a functionalized soft carbon-based bulk material (thickness >200 μm) as a cathode active material and those of the corresponding surface-controlled battery cell (Sample-1) have enabled us to obtain significant data as summarized in the Ragone plot of FIG. 6. This plot allows us to make the following observations:

(a) The surface-controlled, lithium ion-exchanging battery device exhibits significantly higher energy densities and power densities than those of the corresponding super-battery, particularly at relatively high current densities (higher power density data points in the plot). This demonstrates that the presence of a nano-structured anode (in addition to the nano-structured cathode) enables high rates of lithium ion deposition onto and release from the massive surface areas of the anode during the re-charge and discharge cycles, respectively. The prior art super-battery, having a current collector alone with a limited specific surface area as the anode, cannot provide a sufficient amount of surface area for use by the lithium ions that try to deposit onto or release from the limited surface area all at the same time. The whole charge or discharge process becomes surface-limited.

(b) The surface-controlled, lithium ion-exchanging battery device exhibits significantly higher energy densities and power densities than those of the corresponding symmetric supercapacitors (Sample-1-CB) and those of the prior art supercapacitor composed of a functionalized LBL CNT anode and a functionalized LBL-CNT cathode of Lee, et al, both supercapacitors having no lithium foil as a lithium source. Actually, the two symmetric supercapacitors (without a lithium source), based on either disordered carbon or LBL-CNT, exhibit almost identical Ragone plots even though the two electrodes are dramatically different in thickness (>100 μM for the disordered carbon electrode and <3.0 μm for the LBN-CNT electrode). This is likely a manifestation of the local surface adsorption or electric double layer mechanism associated with a conventional supercapacitor that does not require long-range transport of the charges (in particular, requiring no exchange of lithium ions between the anode and the cathode).

(c) As mentioned earlier in the Background section, the power density of a state-of-the-art supercapacitor is typically of 5,000-10,000 W/Kg, but that of a lithium-ion battery is 100-500 W/kg. This implies that the presently invented surface-controlled lithium battery device has an energy density comparable to that of a modern battery, which is 5-16 times higher than the energy density of conventional supercapacitors. The surface-controlled device also exhibits a power density (or charge-discharge rates) significantly higher than the power density of conventional electrochemical supercapacitors.

Further calculations from the obtained data indicate that the discharge time for this prior art super-battery is 19 seconds at the current density of 10 A/g. By contrast, the discharge time for the corresponding surface-controlled battery is less than 5 seconds at the same current density.

The cells of Sample-1 and Samples-1-CA work on the redox reactions of lithium ions with select functional groups on the surfaces/edges of aromatic rings at the cathode side (Sample-1-CA) and at both the cathode and the anode (Sample-1). These functional groups, attached to both the edge and plane surfaces of aromatic rings (small graphene sheets), are capable of rapidly and reversibly react with lithium. This capability has been proven in our two patent applications on super-batteries cited earlier.

The surface-controlled lithium ion-exchanging battery of the present invention is a revolutionary new energy storage device that fundamentally differs from a supercapacitor since an electric double layer (EDL) supercapacitor relies on the formation of EDL charges at the electrode-electrolyte interface. In addition, the supercapacitor does not involve exchange of lithium ions between the anode and the cathode. This surface-controlled battery device also differs from conventional lithium ion batteries where lithium intercalates into inter-graphene spaces in a graphite particle of an anode or where both the anode and cathodes are based on lithium intercalation compounds. Finally, this surface-controlled battery device also differs from lithium the lithium super-battery where the anode does not contain a functional material.

Example 2

Functionalized Activated Carbon

Activated carbon (AC, from Ashbury Carbon Co.) was treated with an acid solution (sulfuric acid, nitric acid, and potassium permanganate at a ratio of 4:1:0.05) for 24 hours. Upon completion of the reaction, the mixture was poured into deionized water and filtered. The treated AC was repeatedly washed in a 5% solution of HCl to remove most of the sulphate ions. The sample was then washed repeatedly with deionized water until the pH of the filtrate was neutral. The slurry was subjected to further functionalization in formic acid at 25° C. for 30 minutes in an ultrasonication bath.

Subsequently, dip-coating was used to obtain thin films of chemically functionalized activated carbon (f-AC) with a thickness of typically between 20 and 150 μm coated on a surface of an aluminized carbon layer as a current collector. Such an electrode was used as an anode and the same type of material was used as a cathode, with a lithium foil implements between a porous separator and one electrode as a lithium source.

Example 3

NGPs from Sulfuric Acid Intercalation and Exfoliation of MCMBs

MCMB 2528 microbeads (Osaka Gas Chemical Company, Japan) have a density of about 2.24 g/cm$^3$; a median size of about 22.5 microns, and an inter-planar distance of about 0.336 nm. MCMB 2528 (10 grams) were intercalated with an acid solution (sulfuric acid, nitric acid, and potassium permanganate at a ratio of 4:1:0.05) for 24 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 600° C. for 30 seconds to obtain exfoliated graphite. The exfoliated MCMB sample was subjected to further functionalization in formic acid at 25° C. for 30 minutes in an ultrasonication bath to obtain functionalized graphene (f-NGP).

Figure 7:
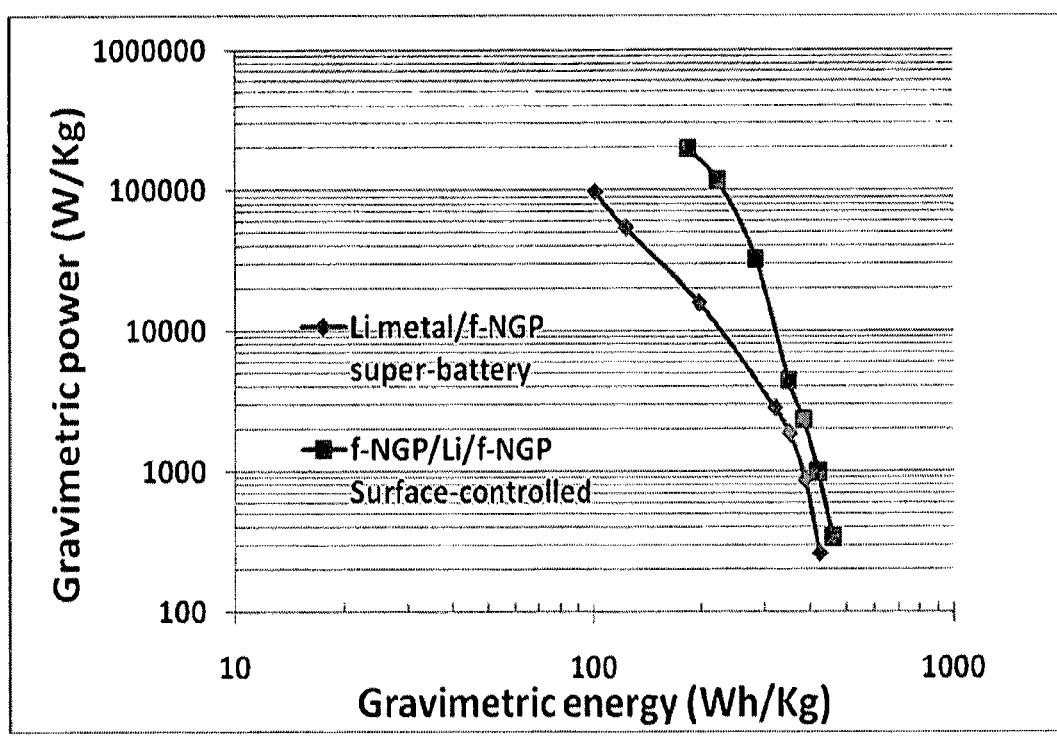
FIG. 7. Ragone plot of a functionalized NGP-based lithium super-battery and that of a corresponding surface-controlled, lithium ion-exchanging battery device. These data further demonstrate that the surface-controlled device performs much better particularly when at the higher densities (higher power density region).

For a surface-controlled battery, NGPs were used as both a cathode material and as an anode material. A lithium foil was added between the anode and the separator. For a reference super-battery, the anode is a lithium foil (no nano-structured NGP) and the cathode is f-NGP. The Ragone plot for these two types of cells is shown in FIG. 7. The NGP-based, surface-controlled, lithium ion-exchanging battery device exhibits significantly higher energy densities and power densities than those of the corresponding super-battery, particularly at relatively high current densities (higher power density data points in the plot). This again demonstrates the superior performance of the surface-controlled device over the super-battery.

Example 4

Figure 8B:
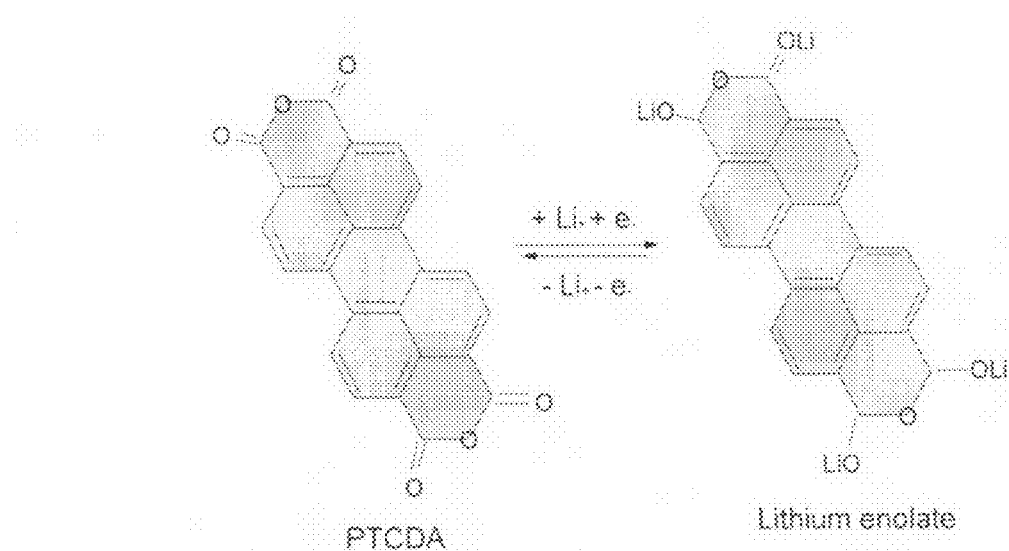
FIG. 8. (A) The carbonyl groups on PTCDA are capable of forming redox pairs with lithium ions; (B) Ragone plot of a carbonyl-containing organic material (PTCDA), its sulfide polymer (PTCDA-S), and graphene-supported PTCDA.
Figure 8B:
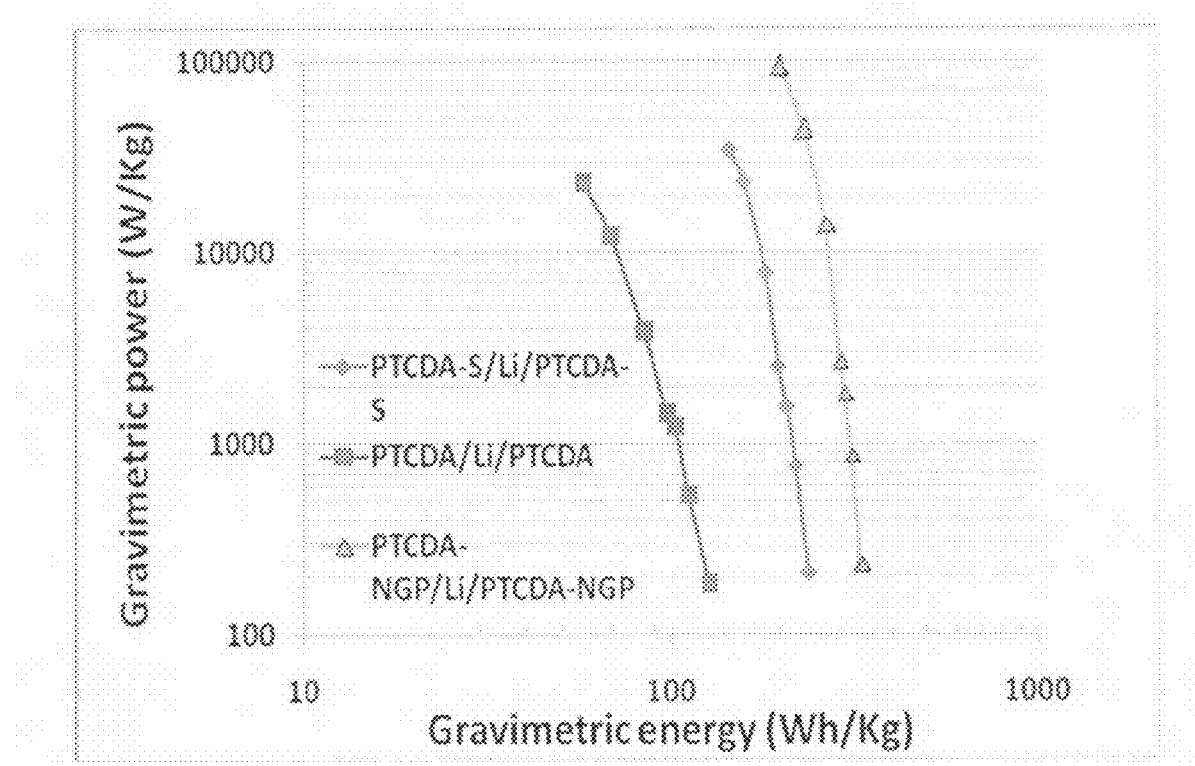

Organic 3,4,9,10-perylenetetracarboxylicacid-dianhydride (PTCDA), PTCDA sulfide polymer, and Nano-structured NGP-supported PTCDA Enolation is an important reaction of carbonyl double bonds, which can be stabilized by conjugated structures. Enolation makes it possible for Li ions to be captured or released reversibly at the positions of oxygen atoms when the carbonyl groups are reduced or oxidized, implying that it could be used as a novel organic energy-storage system in Li-ion batteries. In the reduction process of PTCDA, each carbonyl group can receive one electron and capture one Li ion to form lithium enolate, and the Li ions can be released in the reverse oxidation process, as illustrated in FIG. 8(A).

Three types of electrodes for use as both the anode and the cathode of a surface-controlled lithium ion-exchanging battery device were prepared. The first type was a simple mixture of PTCDA and carbon black (approximately 20% by weight), bonded by PVDF (Sample 3-A).

The second type (Sample 3-B) was a similar mixture of PTCDA sulfide polymer again with carbon black as a conductive filler. The PTCDA sulfide polymer was synthesized by using PTCDA (bright red) and sublimed sulfur as starting materials, which were fully mixed by grinding with a mass ratio of 1:1. The mixtures were reacted at 500° C. in a flowing argon atmosphere for 3 h to obtain black-red powders of PTCDA sulfide polymer. This synthesis route was originally proposed by X. Y. Han, et al. ["Aromatic carbonyl derivative polymers as high-performance Li-ion storage materials," Adv. Material, 19, 1616-1621(2007)].

The third type (Sample 3-C) was a graphene-supported PTCDA electrode; no carbon black was used. Graphite oxide was prepared by oxidation of natural graphite flakes with sulfuric acid, sodium nitrate, and potassium permanganate at a ratio of 4:1:0.05 at 30° C. for 48 hours. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 5-7. The intent was to remove most or all of sulfuric and nitric acid residue out of graphite interstices. The PTCDA, at a PDTCA-to-graphite ratio of 85/15, was then added to the graphite oxide-water solution. The suspension was then ultrasonicated for 15 minutes to fully separate individual graphene oxide sheets and to well-disperse both the graphene oxide and PTCDA in water. The suspension was then boiled at 100° C. to remove most of water and then allowed to be further dried in a vacuum oven. The resulting solid powder was then transferred to a quartz tube preset at 500° C. and allowed PTCDA to react with graphene oxide for two hours. The resulting powder was then removed from the reactor, cooled to room temperature, and made into electrodes in a glove box.

Coin cells similar to those discussed in Example 1 were prepared and similarly evaluated. The results are summarized in the Ragone plot of FIG. 8(B), which clearly show that the surface-controlled battery device based on PTCDA sulfide polymer electrodes perform much superior to the corresponding battery based on PTCDA (with no sulfur treatment). This is likely due to the fact that PTCDA is not an electronically conductive material. With a sulfur treatment, the resulting sulfide polymer is more conducting, according to Han, et al. However, the conductivity of PTCDA sulfide polymer is still relatively low. By combining PTCDA with graphene oxide to obtain the graphene-supported PTCDA, we obtain a much better surface-controlled lithium ion-exchanging battery device in terms of both the energy density and power density at comparable current densities.

In conclusion, the instant invention provides a revolutionary energy storage device that has the best features of both the supercapacitor and the lithium ion battery. The device can deliver a power density higher than that of the best supercapacitor by a factor of 2-16 while also maintaining an energy density higher than that of the best supercapacitor by a factor of 6-10. The presently invented surface-controlled lithium battery using a functionalized nano-structured carbon (such as disordered carbon and NGP) as an anode and a cathode exhibits a power density of ~10-30 times higher than that of conventional lithium-ion batteries. These surface-controlled batteries can be re-charged in seconds, as opposed to hours for conventional lithium ion batteries. This is truly a breakthrough or revolutionary technology.

We claim:

1. A surface-controlled, lithium ion-exchanging battery device comprising:
   (a) a positive electrode consisting of a first functional material having a first lithium-capturing or lithium-storing surface to store lithium ions or atoms thereon, wherein said first functional material is selected from the group consisting of: (A) a disordered carbon material selected from a soft carbon, hard carbon, polymeric carbon or carbonized resin, meso-phase carbon, coke, carbonized pitch, carbon black, activated carbon, or partially graphitized carbon; (B) a nano graphene platelet selected from a single-layer graphene sheet or multi-layer graphene platelet; (C) a metal oxide nano-wire or fiber, conductive polymer nano-fiber, or a combination thereof; (D) a carbonyl-containing organic or polymeric molecule selected from the group consisting of Poly(2,5-dihydroxy-1,4-benzoquinone-3,6-methylene), $Li_xC_6O_6$, wherein x=1-3, $Li_2(C_6H_2O_4)$, $Li_2C_8H_4O_4$, $Li_2C_6H_4O_4$, 3,4,9,10-perylenetetracarboxylicacid-dianhydride sulfide polymer, 1,4,5,8-naphthalene-tetracarboxylicacid-dianhydride, Benzene-1,2,4,5-tetracarboxylic dianhydride, 1,4,5,8-tetrahydroxy anthraquinon, Tetrahydroxy-p-benzoquinone, and combinations thereof; (E) combinations thereof,
   (b) a negative electrode consisting of a lithium source prior to a first discharge cycle of the battery device and a second functional material having a second lithium-capturing or lithium-storing surface to store lithium ions or atoms thereon, wherein said second functional material is selected from the group consisting of: (A) a disordered carbon material selected from a soft carbon, hard carbon, polymeric carbon or carbonized resin, meso-phase carbon, coke, carbonized pitch, carbon black, activated carbon, or partially graphitized carbon; (B) a nano graphene platelet selected from a single-layer graphene sheet or multi-layer graphene platelet; (C) a metal oxide nano-wire or fiber, conductive polymer nano-fiber, or a combination thereof; (D) a carbonyl-containing organic or polymeric molecule selected from the group consisting of Poly(2,5-dihydroxy-1,4-benzoquinone-3,6-methylene), $Li_xC_6O_6$, wherein x=1-3, $Li_2(C_6H_2O_4)$, $Li_2C_8H_4O_4$, $Li_2C_6H_4O_4$, 3,4,9,10-perylenetetracarboxylicacid-dianhydride sulfide polymer, 1,4,5,8-naphthalene-tetracarboxylicacid-dianhydride, Benzene-1,2,4,5-tetracarboxylic dianhydride, 1,4,5,8-tetrahydroxy anthraquinon, Tetrahydroxy-p-benzoquinone, and combinations thereof; and (E) combinations thereof,
   (c) a porous separator disposed between the negative electrode and the positive electrode, and
   (d) a lithium-containing electrolyte in physical contact with the positive electrode and the negative electrode,
   wherein an operation of said surface-controlled, lithium ion-exchanging battery device does not require solid state diffusion of lithium in both said negative electrode and said positive electrode.

2. The battery device of claim 1, wherein the electrolyte comprises liquid electrolyte or gel electrolyte.

3. The battery device of claim 1, wherein at least one of the first functional material and the second functional material has a functional group that reversibly reacts with a lithium atom or ion.

4. The battery device of claim 1, wherein both of the first functional material and the second functional material have a functional group that reversibly reacts with a lithium atom or ion.

5. The battery device of claim 1, wherein said first functional material is nano-structured and has a specific surface area no less than 100 $m^2$/gram to store or support lithium ions or atoms thereon.

6. The battery device of claim 5, wherein the specific surface area is no less than 500 $m^2$/gram.

7. The battery device of claim 1, wherein said second functional material has a specific surface area no less than 500 $m^2$/gram.

8. The battery device of claim 1, wherein the lithium source comprises a lithium chip, lithium foil, lithium powder, surface stabilized lithium particles, or a combination thereof.

9. The battery device of claim 1, wherein said first functional material or said second functional material is selected from the group consisting of Poly(2,5-dihydroxy-1,4-benzoquinone-3,6-methylene), $Li_xC_6O_6$, wherein x=1-3, $Li_2(C_6H_2O_4)$, $Li_2C_8H_4O_4$, $Li_2C_6H_4O_4$, 3,4,9,10-perylenetetracarboxylicacid-dianhydride sulfide polymer, PTCDA, 1,4,5,8-naphthalene-tetracarboxylicacid-dianhydride, Benzene-1,2,4,5-tetracarboxylic dianhydride, 1,4,5,8-tetrahydroxy anthraquinon, Tetrahydroxy-p-benzoquinone, and combinations thereof.

10. The battery device of claim 1 wherein said disordered carbon material is formed of two phases with a first phase being graphite crystals or stacks of graphene planes and a second phase being non-crystalline carbon and wherein the first phase is dispersed in the second phase or bonded by the second phase.

11. The battery device of claim 1 wherein said disordered carbon material contains less than 90% by volume of graphite crystals and at least 10% by volume of non-crystalline carbon.

12. The battery device of claim 1 wherein at least one of the first or second functional materials is nano graphene selected from a single-layer graphene sheet or a multi-layer graphene platelet.

13. The battery device of claim 1 wherein both the first functional material and the second functional material comprise a nano graphene material selected from a single-layer graphene sheet or a multi-layer graphene platelet.

14. The battery device of claim 1 wherein at least one of the first and second functional materials is nano-structured and has a specific surface area of at least 1,000 $m^2$/g.

15. The battery device of claim 1 wherein at least one of the first and second functional materials is nano-structured and has a specific surface area of at least 1,500 $m^2$/g.

16. The battery device of claim 1 wherein at least one of the first and second functional materials has a functional group selected from —COOH, =O, —$NH_2$, —OR, or —COOR, where R is a hydrocarbon radical.

17. The battery device of claim 1 wherein said lithium source is selected from lithium metal, a lithium metal alloy, a mixture of lithium metal or lithium alloy with a lithium intercalation compound, a lithiated compound, lithiated titanium dioxide, lithium titanate, lithium manganate, a lithium transition metal oxide, $Li_4Ti_5O_{12}$, or a combination thereof.

18. The battery device of claim 17, wherein the lithium intercalation compound or lithiated compound is selected from the following groups of materials:
   (a) lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
   (b) lithiated alloys or intermetallic compounds of Si, Ge, Sn, Pb, Sb, Bi, Zn, Al, Ti, Co, Ni, Mn, Cd, and their mixtures;

(c) lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof, and (d) lithiated salts or hydroxides of Sn.

19. The battery device of claim 1 wherein said electrolyte comprises a lithium salt-doped ionic liquid.

20. The battery device of claim 1 wherein the electrolyte is a liquid electrolyte or a gel electrolyte.

21. The battery device of claim 1 wherein said device provides an energy density of no less than 100 Wh/kg and power density no lower than 15 Kw/kg, all based on the total weight of said negative electrode and said positive electrode combined.

22. The battery device of claim 1 wherein said device provides an energy density of no less than 200 Wh/kg and power density no lower than 10 Kw/kg, all based on the total weight of said negative electrode and said positive electrode combined.

23. The battery device of claim 1 wherein said device provides an energy density of no less than 300 Wh/kg and power density no less than 5 Kw/kg, all based on the total weight of said negative electrode and said positive electrode combined.

24. The battery device of claim 1 wherein said device provides an energy density of no less than 300 Wh/kg or a power density no less than 100 Kw/kg, all based on the total weight of said negative electrode and said positive electrode combined.

25. The battery device of claim 1 wherein said device provides a power density no less than 200 Kw/kg, based on the total weight of said negative electrode and said positive electrode combined.

26. The battery device of claim 1 wherein said positive electrode has a thickness greater than 5 μm.

27. The battery device of claim 1 wherein said positive electrode has a thickness greater than 50 μm.

28. The battery device of claim 1 wherein said positive electrode has a thickness greater than 100 μm.

29. A surface-controlled, lithium ion-exchanging battery device comprising:

(a) a positive electrode consisting of a nano-structured material and a first functional material having a first lithium-capturing or lithium-storing surface to store lithium ions or atoms thereon, wherein said first functional material is selected from the group consisting of: (A) a disordered carbon material selected from a soft carbon, hard carbon, polymeric carbon or carbonized resin, meso-phase carbon, coke, carbonized pitch, carbon black, activated carbon, or partially graphitized carbon; (B) a nano graphene platelet selected from a single-layer graphene sheet or multi-layer graphene platelet; (C) a metal oxide nano-wire or fiber, conductive polymer nano-fiber, or a combination thereof; (D) a carbonyl-containing organic or polymeric molecule; and (E) combinations thereof, (b) a negative electrode consisting of a lithium source prior to a first discharge cycle of the battery device and a second functional material having a second lithium-capturing or lithium-storing surface to store lithium ions or atoms thereon, wherein said second functional material is selected from the group consisting of: (A) a disordered carbon material selected from a soft carbon, hard carbon, polymeric carbon or carbonized resin, meso-phase carbon, coke, carbonized pitch, carbon black, activated carbon, or partially graphitized carbon; (B) a nano graphene platelet selected from a single-layer graphene sheet or multi-layer graphene platelet; (C) a metal oxide nano-wire or fiber, conductive polymer nano-fiber, or a combination thereof; (D) a carbonyl-containing organic or polymeric molecule; and (E) combinations thereof, (c) a porous separator disposed between the negative electrode and the positive electrode, and (d) a lithium-containing electrolyte in physical contact with the positive electrode and the negative electrode, wherein an operation of said surface-controlled, lithium ion-exchanging battery device does not require solid state diffusion of lithium in both said negative electrode and said positive electrode and wherein said carbonyl-containing organic or polymeric molecule in said first functional material or said second functional material is selected from the group consisting of Poly(2,5-dihydroxy-1,4-benzoquinone-3,6-methylene), $Li_xC_6O_6$, wherein x=1-3, $Li_2(C_6H_2O_4)$, $Li_2C_8H_4O_4$, $Li_2C_6H_4O_4$, 3,4,9,10-perylenetetracarboxylicacid-dianhydride sulfide polymer, PTCDA, 1,4,5,8-naphthalene-tetracarboxylicacid-dianhydride, Benzene-1,2,4,5-tetracarboxylic dianhydride, 1,4,5,8-tetrahydroxy anthraquinon, Tetrahydroxy-p-benzoquinone, and combinations thereof, and said carbonyl-containing organic or polymeric molecule in this first functional material is combined with or supported by said nano-structured material selected from nano graphene, disordered carbon, nano graphite, metal nanowire, polymeric nano-fiber.

* * * * *